United States Patent
Sugiura et al.

(10) Patent No.: US 7,054,018 B1
(45) Date of Patent: May 30, 2006

(54) PRINTING APPARATUS AND PRINTING CONTROL METHOD AND CHARACTER FONT PATTERN CONTROL METHOD IN PRINTING APPARATUS

(75) Inventors: Takayuki Sugiura, Hyogo (JP); Naoto Fujii, Hyogo (JP); Yoshikazu Ohnishi, Hyogo (JP); Noriko Shiba, Hyogo (JP); Keiko Suehiro, Hyogo (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/480,694

(22) Filed: Jan. 11, 2000

Related U.S. Application Data

(60) Division of application No. 08/928,467, filed on Sep. 12, 1997, now Pat. No. 6,047,111, which is a continuation of application No. 08/412,015, filed on Mar. 28, 1995, now abandoned.

(30) Foreign Application Priority Data

Jul. 22, 1994  (JP)  .................................. 6-171409

(51) Int. Cl.
G06F 13/00 (2006.01)
G06F 3/12 (2006.01)

(52) U.S. Cl. .................................... 358/1.15; 358/1.14

(58) Field of Classification Search ................ 358/115, 358/1.14, 1.13, 501, 401, 498; 355/407, 355/408; 399/16, 23, 66, 81, 84; 270/58.23, 270/58.18, 52.2, 53; 271/298, 3.04, 3.06, 271/3.09, 9.02, 9.05, 9.06
See application file for complete search history.

(56) References Cited

U.S. PATENT DOCUMENTS

| 4,466,065 | A | 8/1984 | Advani et al. .............. 395/874 |
|---|---|---|---|
| 5,075,874 | A | 12/1991 | Steeves et al. .............. 395/112 |
| 5,081,595 | A | 1/1992 | Moreno et al. ............. 395/111 |
| 5,113,355 | A | 5/1992 | Nomura ...................... 395/109 |
| 5,119,472 | A | 6/1992 | Ogawa ........................ 395/111 |
| 5,220,674 | A | 6/1993 | Morgan et al. ............. 395/110 |
| 5,299,296 | A | 3/1994 | Padalino et al. ............ 395/112 |
| 5,303,336 | A | 4/1994 | Kageyama et al. ......... 395/114 |
| 5,327,526 | A | 7/1994 | Nomura et al. ............. 395/115 |
| 5,371,837 | A | 12/1994 | Kimber et al. .............. 395/114 |

(Continued)

FOREIGN PATENT DOCUMENTS

DE    4006891    9/1990

(Continued)

OTHER PUBLICATIONS

Office Action dated Jul. 22, 1999 from co-pending German Application No. 195 49 499.7-53 (with translation).

(Continued)

*Primary Examiner*—Douglas Q. Tran
(74) *Attorney, Agent, or Firm*—Staas & Halsey LLP

(57) ABSTRACT

Printing equipment for processing relevant print requests from a plurality of host devices in parallel and its printing control method. A plurality of logical printers are provided in one unit of physically existing printing apparatus and one logical printer is allotted to each one of host devices so that processing of the print data from a plurality of host devices can be carried out in parallel. One virtual host interface exists for each logical printer and this host interface establishes session with the corresponding host device to transfer data. Each logical printer independently takes charge of emulation, respectively. Operating a plurality of logical printers in one unit of printing apparatus realizes multi-session and multi-emulation.

4 Claims, 32 Drawing Sheets

U.S. PATENT DOCUMENTS

| | | | | |
|---|---|---|---|---|
| 5,435,544 | A | * | 7/1995 | Mandel ................... 271/298 |
| 5,464,200 | A | * | 11/1995 | Nakazato et al. .......... 270/53 |
| 5,559,933 | A | | 9/1996 | Boswell .................. 395/114 |
| 5,600,770 | A | | 2/1997 | Kawabata et al. ........ 395/805 |
| 5,977,954 | A | * | 11/1999 | Arimoto et al. ........... 345/168 |
| 6,088,132 | A | * | 7/2000 | Tsuji ...................... 358/471 |

FOREIGN PATENT DOCUMENTS

| | | |
|---|---|---|
| EP | 0468762 | 1/1992 |
| EP | 0 564 202 A1 | 10/1993 |
| EP | A1 458569 | 9/1996 |
| JP | 59-163634 | 9/1984 |
| JP | 62-38930 | 2/1987 |
| JP | 62-139469 | 6/1987 |
| JP | 63-071722 | 4/1988 |
| JP | 63-075923 | 4/1988 |
| JP | 1-139291 | 5/1989 |
| JP | 2-52770 | 2/1990 |
| JP | 02-148094 | 6/1990 |
| JP | 2-186428 | 7/1990 |
| JP | 2-236614 | 9/1990 |
| JP | 03-075861 | 3/1991 |
| JP | 3-105421 | 5/1991 |
| JP | 03-149617 | 6/1991 |
| JP | 3-92690 | 9/1991 |
| JP | 3-265025 | 11/1991 |
| JP | 3-265895 | 11/1991 |
| JP | 4-3219 | 1/1992 |
| JP | 4-43426 | 2/1992 |
| JP | 4-75153 | 3/1992 |
| JP | 4-192029 | 7/1992 |
| JP | 4-205226 | 7/1992 |
| JP | 4-207540 | 7/1992 |
| JP | 4-314122 | 11/1992 |
| JP | 05-061620 | 3/1993 |
| JP | 05-155110 | 6/1993 |
| JP | 5-162415 | 6/1993 |
| JP | 5-189174 | 7/1993 |
| JP | 5-204563 | 8/1993 |
| JP | 5-208539 | 8/1993 |
| JP | 5-278273 | 10/1993 |
| JP | 5-289834 | 11/1993 |
| JP | 5-301393 | 11/1993 |
| JP | 6-4240 | 1/1994 |
| JP | 6-28122 | 2/1994 |
| JP | 6-40089 | 2/1994 |
| JP | 6-59838 | 3/1994 |
| JP | 06-149217 | 5/1994 |
| JP | 6-149495 | 5/1994 |
| JP | 06-183062 | 7/1994 |
| JP | 07-121324 | 5/1995 |
| JP | 01-188354 | 7/1999 |

OTHER PUBLICATIONS

Japanese Office Action dated Feb. 10, 1998; Application No. 6-171409.

Office Action dated Jun. 28, 2000 from related German Application Serial No. 195 49 499.7-53, with translation.

* cited by examiner

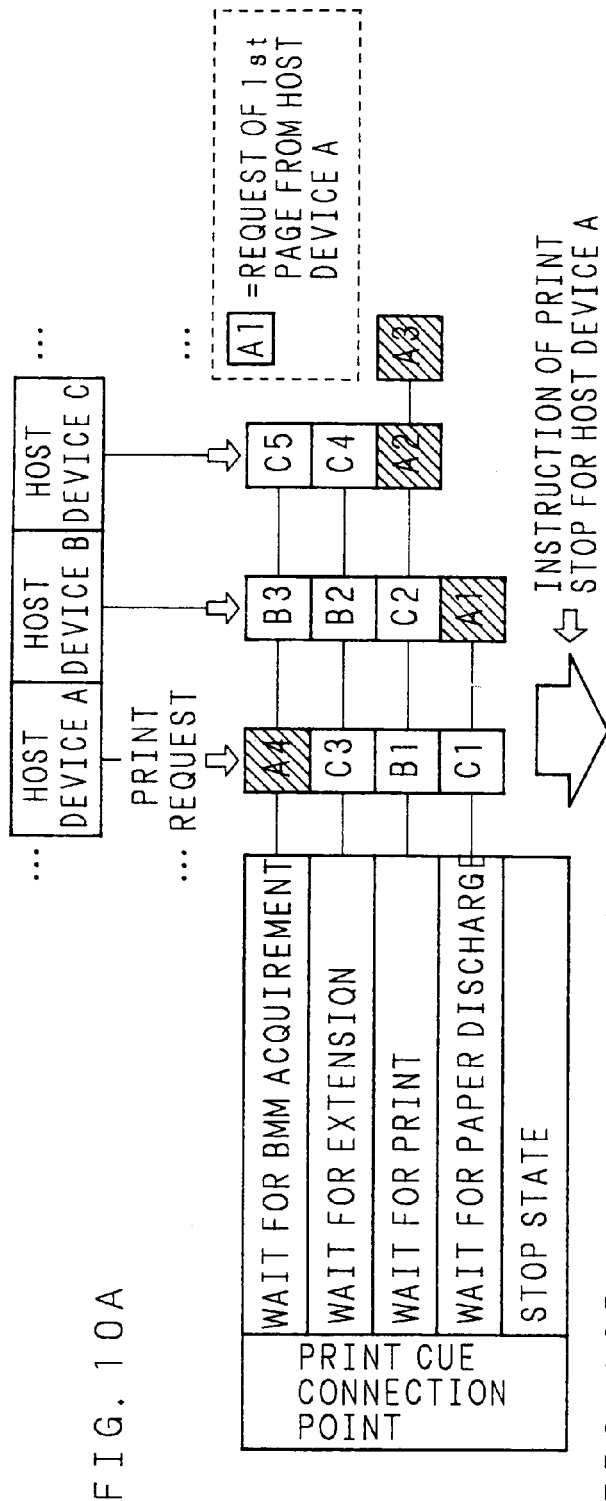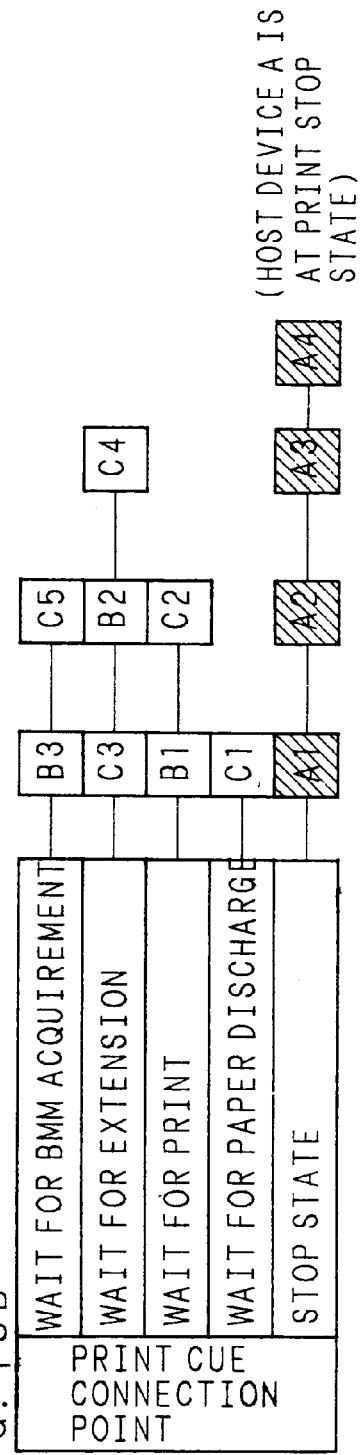

FIG. 14A

```
                        31
┌─────────────────────────────┐
│ ASSIGNMENT OF PAPER FEED    │
│ INLET                       │
│  ⇧▨. INLET 1                │
│  ⬇ 2. INLET 2               │
│ SELECT SET SHIFT    RESET   │
└─────────────────────────────┘
  ☐ ☐ ☐ ☐ ☐
```

3: INLET 3
4: INLET 4
5: MANUAL FEED (KEY OPERATION)
SELECTION KEY
  SELECTING PAPER FEED
  INLET TO BE DEFINED
SET KEY
  CHANGE TO EACH PAPER
  FEED INLET DEFINITION
  SCREEN

⇩ PRESS OF SET KEY

FIG. 14B

```
                    31
┌──────────────────────────────────┐
│ DEFINITION OF PAPER FEED INLET 1 │
│                           LARGE  │
│         UPPER MIDDLE LOWER CAPACITY│
│ EFFECTIVE                        │
│ AREA      ○    —     —     ○    │
│  ↑    →     SET       RESET     │
└──────────────────────────────────┘
```

○ : DEFINITION
— : NO DEFINITION (KEY OPERATION)
↑ : UP KEY
  CHANGING ○/—
→ : RIGHT KEY
  MOVING CURSOR
  TO NEXT PAPER
  FEED INLET

⇩ PRESS OF SET KEY

FIG. 14C

CONTROL TABLE

```
LOGICAL PRITER 1
DEFINITION OF PAPER FEED INLET
                    UPPER  MIDDLE  LOWER  LARGE CAPACITY
      INLET 1 :       O      —       —        —
      INLET 2 :       —      O       —        O
      INLET 3 :       —      —       O        —
      INLET 4 :       —      O       —        O
   MANUAL FEED :      O      —       O        —

LOGICAL PRINTER n
DEFINITION OF PAPER FEED INLET
                    UPPER  MIDDLE  LOWER  LARGE CAPACITY
      INLET 1 :       O      —       —        —
```

O : DEFINITION
— : NO DEFINITION

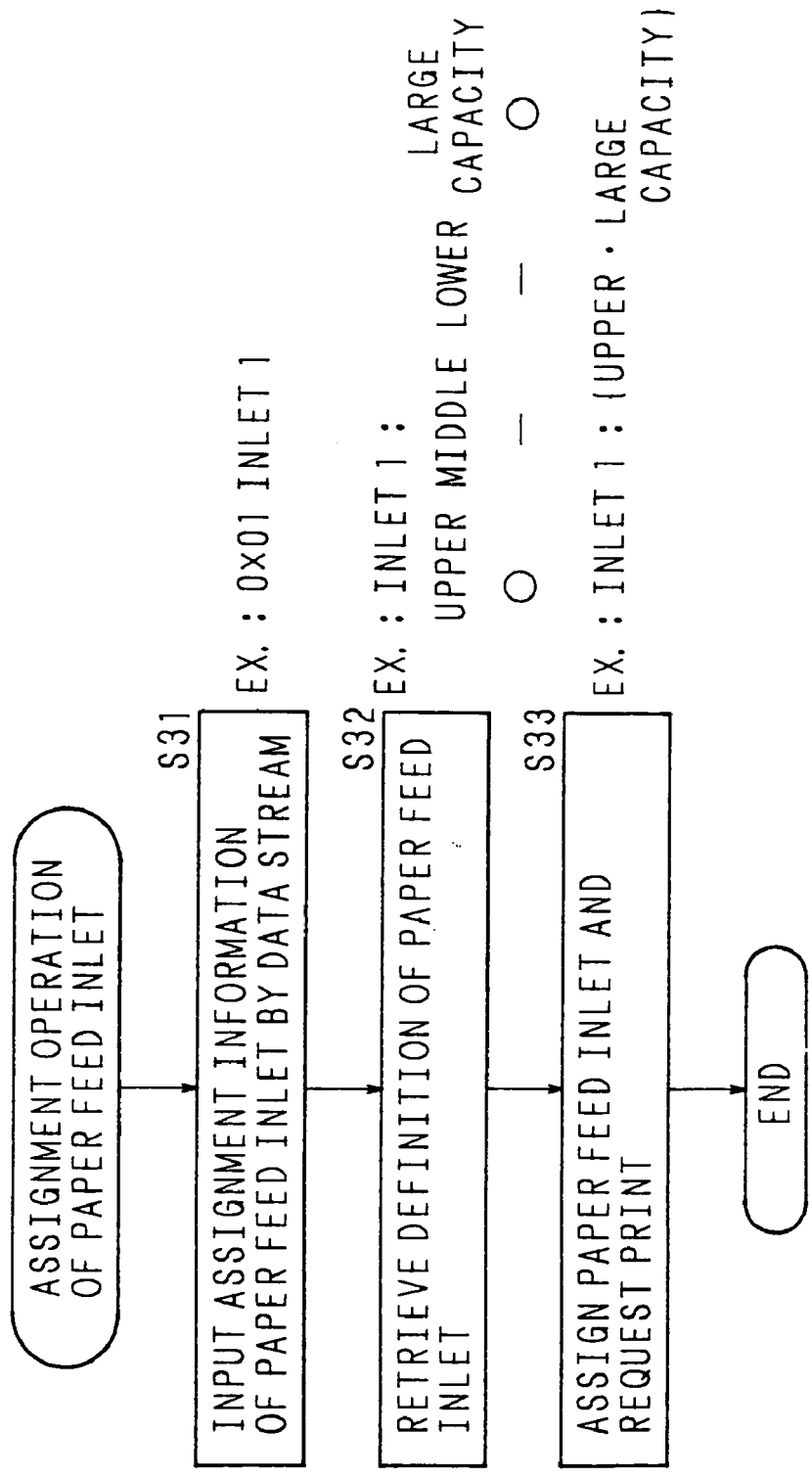

FIG. 16C

CONTROL TABLE

```
LOGICAL PRINTER 1
DEFINITION OF PAPER DISCHARGE OUTLET
                TRAY  STACKER BIN0123456789
  OUTLET 1 :    ○       —
  OUTLET 2 :    ○       ○    —
  OUTLET 3 :    —       —    —
  OUTLET 4 :    —       —    —
      ...
  OUTLET10 :    —       —    —○—— ———○○○○

LOGICAL PRINTER n
DEFINITION OF PAPER DISCHARGE OUTLET
                TRAY  STACKER BIN0123456789
  OUTLET 1 :    ○       ○    ——————————
```

○ : DEFINITION
— : NO DEFINITION

FIG. 18
 : LOGICAL PRINTER AT ON-LINE STATE
(NUMBER IN MARK IS LOGICAL PRINTER NUMBER)
 : LOGICAL PRINTER IN PRITING
 : LOGICAL PRINTER OF HOST DEVICE POWER OFF / OFF-LINE
 : LOGICAL PRINTER OF ERROR FOR PAPER FEED INLET / PAPER DISCHARGE OUTLET (EX. NO PAPER)
 : LOGICAL PRINTER OF DATA ERROR FIG. 20
PRINT BUFFER CONTROL TABLE
START POINTER OF PRIORITY PRINT BLOCK →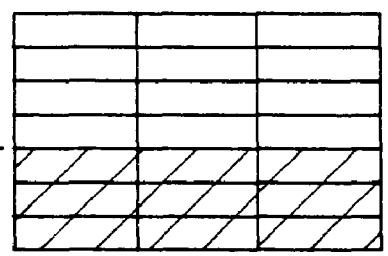
 : BUFFER AREA FOR PRIORITY PRINT

FIG. 27

CHARACTER FONT CASH
CONTROL TABLE

| | LOAD FLAG | USAGE PAGE COUNTER |
|---|---|---|
| SPECIES 1 | LOAD FLAG | USAGE PAGE COUNTER |
| SPECIES 2 | LOAD FLAG | USAGE PAGE COUNTER |
| . | . | . |
| . | . | . |
| SPECIES N | . | . |

FIG. 28

USAGE CHARACTER
SPECIES TABLE

| NUMBER OF USAGE CHARACTER SPECIES M |
|---|
| USAGE CHARACTER SPECIES 1 |
| USAGE CHARACTER SPECIES 2 |
| ⋮ |
| USAGE CHARACTER SPECIES M |

PRINTING APPARATUS AND PRINTING CONTROL METHOD AND CHARACTER FONT PATTERN CONTROL METHOD IN PRINTING APPARATUS

CROSS REFERENCE TO RELATED APPLICATIONS

This application is a divisional of U.S. application Ser. No. 08/928,467 filed Sep. 12, 1997, now U.S. Pat. No. 6,047,111 which is a continuation of U.S. application Ser. No. 08/412,015 filed Mar. 28, 1995, now the contents of which are hereby incorporated by reference.

BACKGROUND OF THE INVENTION

1. Field of the Invention

This invention relates to a printing apparatus and, in particular, to a printing apparatus which receives printing data from a multiplicity of devices for printing.

2. Description of the Prior Art

FIG. 1 shows the operating condition of a conventional printing apparatus which prints the print data from a multiplicity of host devices. In the same figure, the print control section receives a print request from three types of host devices A, B, C and controls actual printing at the print operation section. The hatched portion in the print control section indicates that it carries out processing for converting the print request from each host device into a form by which the print request can be made to the print operation section, while the hatched portion in the print operation section indicates that the section is printing on paper.

Conventionally, the printing apparatus which receives printing data from a multiplicity of host devices for printing returns RECEPTION DISABLED (hereinafter called "BUSY") while the print request from one host device is being processed because it is under operation for the print request from another host device. For example, in FIG. 1, when print requests from other host devices B, C are inputted while the host device A makes a print request to the print control section and before the print is finished, BUSY is outputted and the print requests of the host devices B, C cannot to be received. Therefore, the host devices B, C which received BUSY must wait until the print process of the host device A is completely finished and must make a new print request. This series of operations not only lowers the throughput of the printing apparatus but also processing of BUSY monitoring of host devices has created a significant burden.

Because any print request from another host device is not accepted while a print request from one host device is being processed, even when the print operation section is ready for printing, if the paper of the size requested by the print request currently under processing is not set, even if the paper of the size requested by the print request made by another host device is set, the print request of this other host device is not processed unless the paper of the size requested by the print request under processing is set.

The series of operations and problems as described above result from the control method of the print request in the conventional printing apparatus. FIG. 2 shows a conventional control system of the print request. In the figure, the print request for each page is stored successively in a specified region. The progress of each processing is controlled by the paper discharge pointer, extension pointer, print pointer, BMM (bit map memory) acquirement pointer, and next print request pointer. In this control method, processing is only possible in order of print requests received. Therefore, it is impossible to stop a print request only from one host device or to hold a print request from a host device when the paper of the size requested by the print request is not available and to process the next print request. Because a control system for processing print requests of a multiplicity of host devices in parallel is not adopted in this way, the conventional printing apparatus is designed to reject the print requests of other host devices while a print request from one host device is being processed. This has resulted in low throughput of the printing apparatus and created a problem in that print requests of all the host devices cannot be received once any trouble occurs in the print request from one host device.

In the printing apparatus with a multiplicity of paper feed inlets and discharge outlets, when a discharge outlet is specified, conventionally, one paper feed inlet and discharge outlet are specified from among these paper feed inlets and discharge outlets by the command from host devices or the input using the operation panel on the printing apparatus side. In this type of specifying method, even if the paper feed inlet other than that specified is available in the printing apparatus with a multiplicity of paper feed inlets, if the specified paper feed inlet is unserviceable, ERROR is outputted and the printing operation cannot be begun. To solve this problem, application from the host device should be modified so that a multiplicity of paper feed inlets are allowed to be specified, but there is a problem that modification of application is difficult.

Now, the character font cash control is carried out word by word or host code by host code for two-byte based characters, in the conventional technology. When the cash registration number exceeds the limit, the cashed character font patterns are deleted successively in order of older registration time or larger size of font pattern data, or lower ranking of priority given to each font pattern.

Under this kind of conventional character font cash control method, it is difficult to control the character font pattern with the same code but a different font or character size, and it is also difficult to control the different code system. If the cashed character font patterns are deleted successively in order of older registration time or larger size of data, it is impossible to effectively use the cashed font patterns. It is possible to effectively utilize the cashed font patterns if priority is given to the patterns, but processing associated with it is complicated and an expected high speed may not be achieved in cash processing. If the deletion timing is controlled by the number of registration, deletion must be performed even when there is a space in memory, not resulting in an effective use of memory.

SUMMARY OF THE INVENTION

An object of the invention is to provide a printing apparatus which can process a print request from a plurality of host devices simultaneously and in parallel.

It is another object of this invention to provide a printing control method in the printing apparatus which can accept print requests from a plurality of host devices simultaneously and can increase the throughput of the printing apparatus by adopting the method for controlling a print request as a queue for controlling and managing the print requests.

It is still another object of this invention to provide a printing control method in the printing apparatus which can specify a plurality of paper feed inlets without modifying application from the host devices by defining a plurality of physical paper feed inlets to the parameters that specify individual paper feed inlets specified by commands.

It is a further object of this invention to provide a printing control method in the printing apparatus which can easily control the operational relationship between each host device and the printing apparatus by generally indicating all the relational conditions between each host device and the printing apparatus.

It is still a further object of this invention to provide a printing control method in the printing apparatus which can receive the printing data from the host device with printing priority given preferentially over the printing data from other host devices.

It is an even further object of this invention to provide a printing control method in the printing apparatus which can quickly complete printing data transmission from the host device with printing priority given.

It is an additional object of this invention to provide a character font pattern control method in the printing apparatus that facilitates cash control of character font patterns with the same code but different fonts and character sizes and can efficiently utilize the cashed character font patterns and the space of memory.

The printing apparatus of this invention has means for establishing relevant operational relationship with a plurality of devices which transmit printing data and means for independently processing a plurality of these operational relationships.

The printing control method in the printing apparatus of this invention has an information region indicating printing specifications for each print request from a plurality of devices and queue controls the relevant print requests. For the print queue connection point, a stop state connection point is provided, to which the queue to the device is connected when printing by the print request from a specific device is stopped. While a print request from one device is being received, a print request from another device is also received. The printing apparatus carries out printing in accordance with the print request from another device when any trouble occurs in the paper feed system or paper discharge system in the printing in accordance with the print request from one or a plurality of devices.

In this kind of printing control method, because the print request from a plurality of devices is queue controlled, the order of print requests can easily be changed, and it is possible to control the print requests independently for each device and simultaneously receive print requests from all devices. When a stop state is provided for the connection point of this queue and the queue to the device is connected to this stop state when printing by the print request from a specific device is stopped, the printing apparatus stops printing corresponding to the print request only from this specific device and does not stop printing corresponding to the print request from another device.

The printing control method in another printing apparatus according to this invention establishes the operational relationship, respectively, with each device that transmits the print request and specifies a paper feed inlet and a discharge outlet for each operational relationship. It also specifies a paper discharge outlet for each operational relationship so that the same paper discharge outlet is not specified in a plurality of operational relationships. It also specifies a paper feed inlet and discharge outlet using an operation panel. It displays in a list the condition of a plurality of operational relationships, for example, on an operation panel.

In this kind of printing control method, because the paper feed inlet and discharge outlet are specified for each operational relationship between the printing apparatus and each device, the operator is allowed to optionally specify a paper feed inlet and a discharge outlet without modifying application from the device. Designing the printing apparatus in such a manner to prevent the same paper discharge outlet from being specified in a plurality of operational relationships can prevent printed paper from different devices from being mixed at the paper discharge outlet. Displaying in a list the condition of a plurality of operational relationships between the printing apparatus and each device allows the operator to easily control these plural operational relationships.

The printing control method in still another printing apparatus of this invention classifies the printing data received from a plurality of host devices into priority printing data and normal printing data and provides a region for storing only the priority printing data in the region for storing the received printing data. The region for storing the received printing data is composed of a plurality of blocks with a fixed size and one or a plurality of blocks of these multiple blocks are designated to the region for storing the priority printing data only. The region for storing the received printing data is composed of one memory pool, and part of this memory pool region is designated to the region for storing the priority printing data only. The size of the region for storing only the priority printing data is variable. Designation of the priority printing data can be carried out in accordance with the data from devices and by the panel operation on the printing apparatus side.

In this type of printing control method, because the region for storing only the printing data from the device, for which priority printing shall be carried out, is provided, even if the region for storing the printing data to be used for normal printing is full, it is possible to receive the printing data from the device with printing priority given, and the transmission of the priority printing data is surely completed and the operability of the printing apparatus is improved. Since the size of the region for storing this printing priority data is variable, flexibility of priority printing is improved.

The character font pattern control method in the printing apparatus according to this invention controls cashing by character species including font and character size when the character font pattern is cashed from the auxiliary storage to the main storage. It also cashes the character font pattern of the code systems of different types in addition to classification of the code system into character species. It also controls the number of pages in which relevant character species are used. When there is no space in the main storage, it deletes the font pattern of the character species which is not used in any page. It stores the control table which stores the cash condition in the auxiliary storage when the power supply is interrupted, and reads the stored cash condition when the power is connected next time.

Because the cashing of the character font pattern is controlled by the character species including the character size in the character font pattern control method of this invention, it becomes easy to cash the character font pattern with different fonts and character sizes. Adding the code system to this character species classification facilitates cashing of the character font patterns of different code systems. Counting the number of pages used enables determination of need or no need of deletion of the character font pattern. The frequently used font pattern will not be deleted because there are few cases in which the page with the font pattern becomes zero, and deletion takes place with the priority given to the font pattern. Because deletion takes place when there is no space in the main storage, there is no problem in which the character font pattern must be deleted even when there exists a space in memory, and the memory can be effectively utilized without generating any space in the memory. Because the cashing condition when the power is interrupted is reproduced when the power is reconnected, the character font patterns frequently used are preloaded, resulting in improved printing speed.

The above and further objects and features of the invention will more fully be apparent from the following detailed description with accompanying drawings.

BRIEF DESCRIPTION OF THE DRAWINGS

FIG. 15 is a flow chart showing the assigning procedure of the paper feed inlet in the printing apparatus according to this invention, FIGS. 16 A, B, C are illustrations assigning the paper discharge outlet from the operation panel in the printing apparatus according to this invention, FIG. 18 is a view showing a display example of an icon indicating the operating condition of each logical printer in the printing apparatus according to this invention, FIG. 20 is a schematic diagram of a print buffer control table in the printing apparatus according to this invention, FIG. 27 is a view showing the construction of the character font cash control table in the printing apparatus according to this invention, and FIG. 28 is a view showing the construction of the usage character species table in the printing apparatus according to this invention.

DESCRIPTION OF THE PREFERRED EMBODIMENTS

This invention will be described in further detail with reference to the accompanying drawings showing preferred embodiments.

First of all, the outline of the printing apparatus according to this invention will be described. In this invention, a plurality of virtual printers (hereinafter called "logical printer") are provided in one unit of physically existing printing apparatus so that the conventional vertical linkage capabilities are held and in addition, printing by horizontal linkage is achieved by LAN connection in one printing apparatus, that is, processing of the printing data from a plurality of host devices can be carried out in parallel. In other words, when a plurality of host devices which transmit the printing data to one unit of physically existing printing apparatus are connected to this printing apparatus, the relationship between each host device and this printing apparatus is defined as a logical printer in this invention. When a plurality of host devices are connected to one unit of printing apparatus, it means that a plurality of logical printers exist. In the description below, this plurality of logical printers are called successively logical printer 1, logical printer 2, logic printer 3 and logic printer 4.

Figure 3:
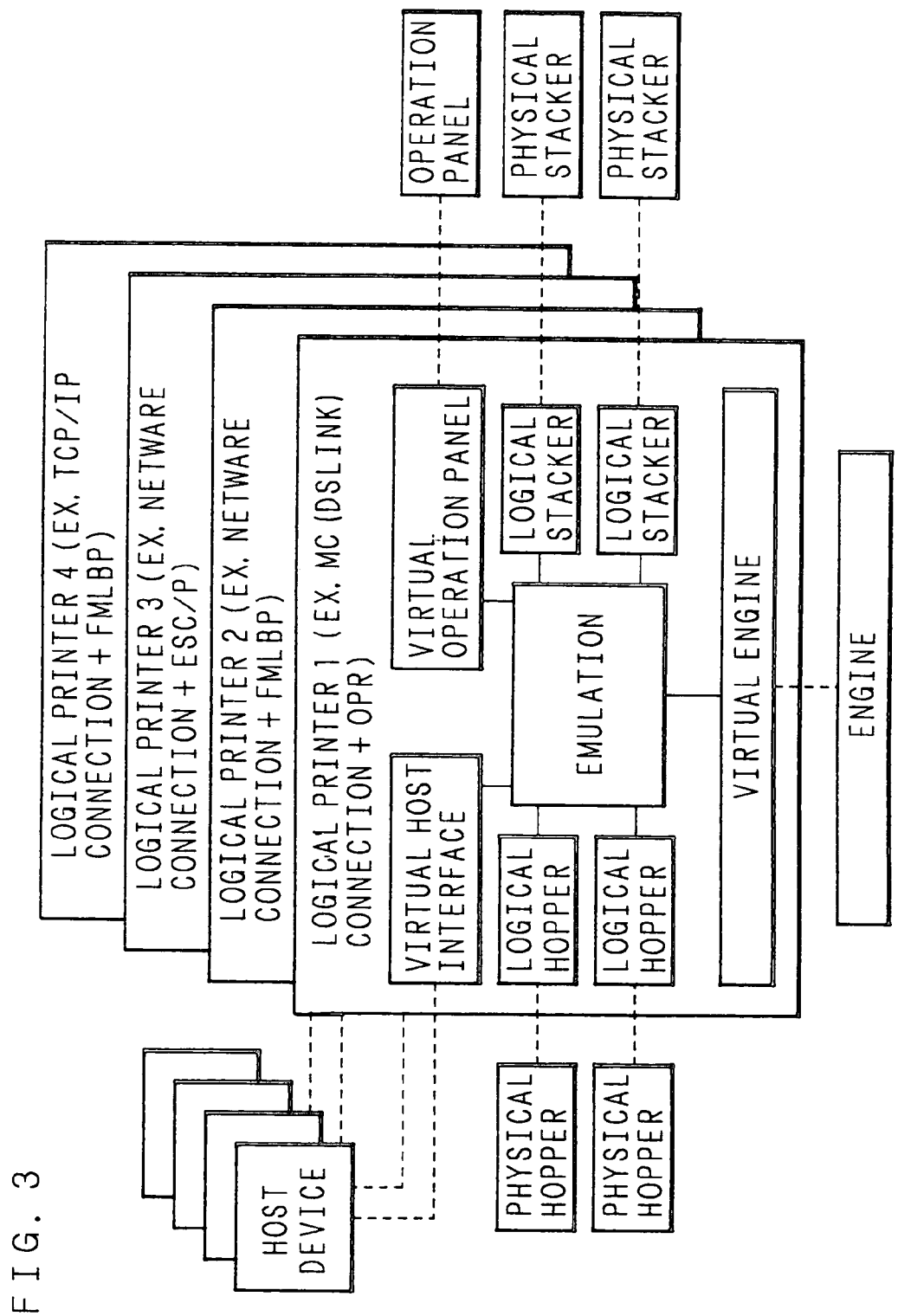
FIG. 3 is a schematic representation of the printing apparatus according to this invention.

FIG. 3 shows the concept of logical printers in the printing apparatus of this invention, and this embodiment indicates the case in which four logical printers 1, 2, 3, 4 are set. Each logical printer is connected to a different host device (host), respectively. When it is connected to LAN, a plurality of communication passes (session) is enabled among a plurality of host devices and internally one virtual host interface exists for each logical printer, and this host interface establishes session with a host device corresponding to this interface and transfers the data. As described above, operating a plurality of logical printers in one unit of printing apparatus realizes multi-session and multi-emulation.

As the logical printer is introduced, it becomes possible to decide an optional combination of a virtual hopper and stacker which each logical printer possesses (hereinafter called a "logical hopper" and "logical stacker," respectively) with a physical hopper and stacker (hereinafter called a "physical hopper" and "physical stacker," respectively) actually provided to the printing apparatus by a command or setting at an operation panel. When paper of a certain size runs out, only the printing operation of the logical printer which requires this paper stops and other logical printers which do not require the paper of that size continue printing operation. Even when any trouble occurs in communication with host devices, only the printing operation of the logical printer connected to that host device is stopped. Because the operating condition of each logical printer must be displayed on one operation panel, part of displayed messages is iconed. Assignment of logical hopper and logical stacker in this type of each logical printer and operation display of each logical printer on one operation panel will be described later.

Figure 4:
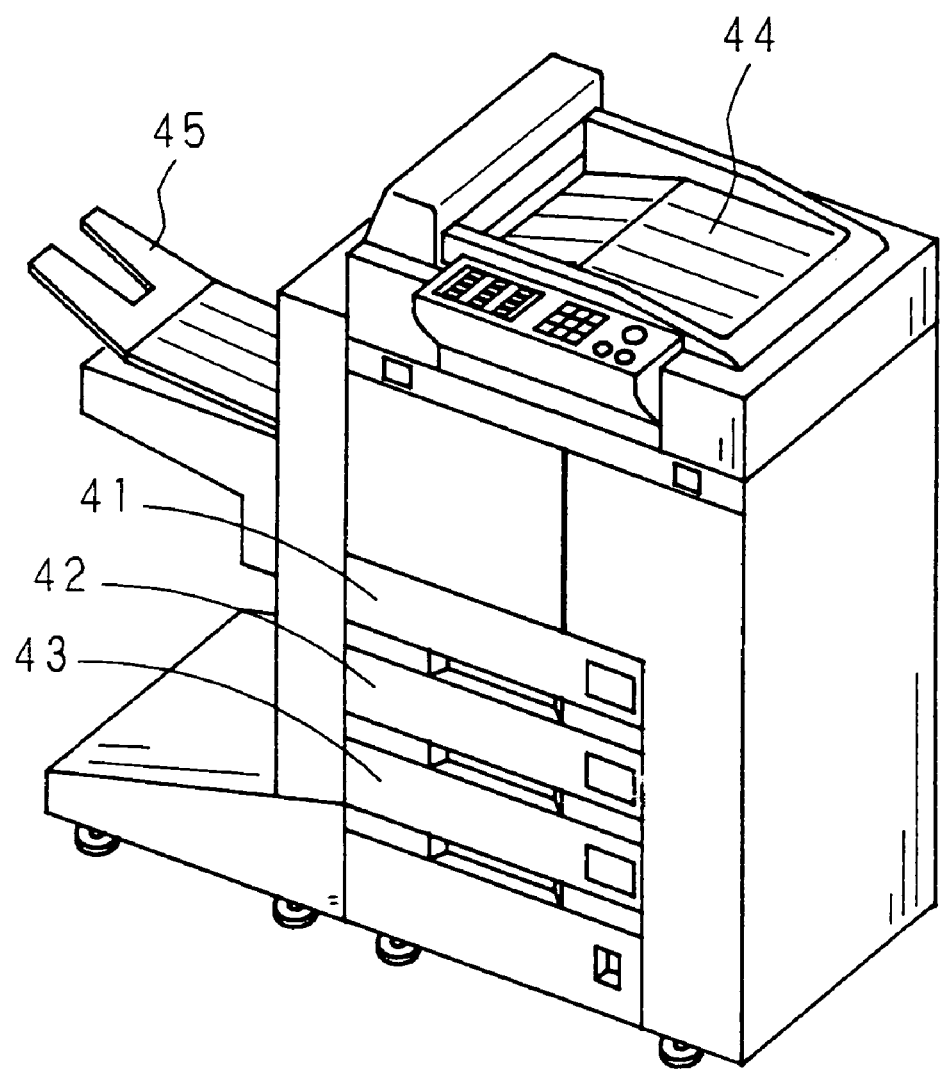
FIG. 4 is a perspective view showing the appearance of one embodiment of the printing apparatus according to this invention.
Figure 5:
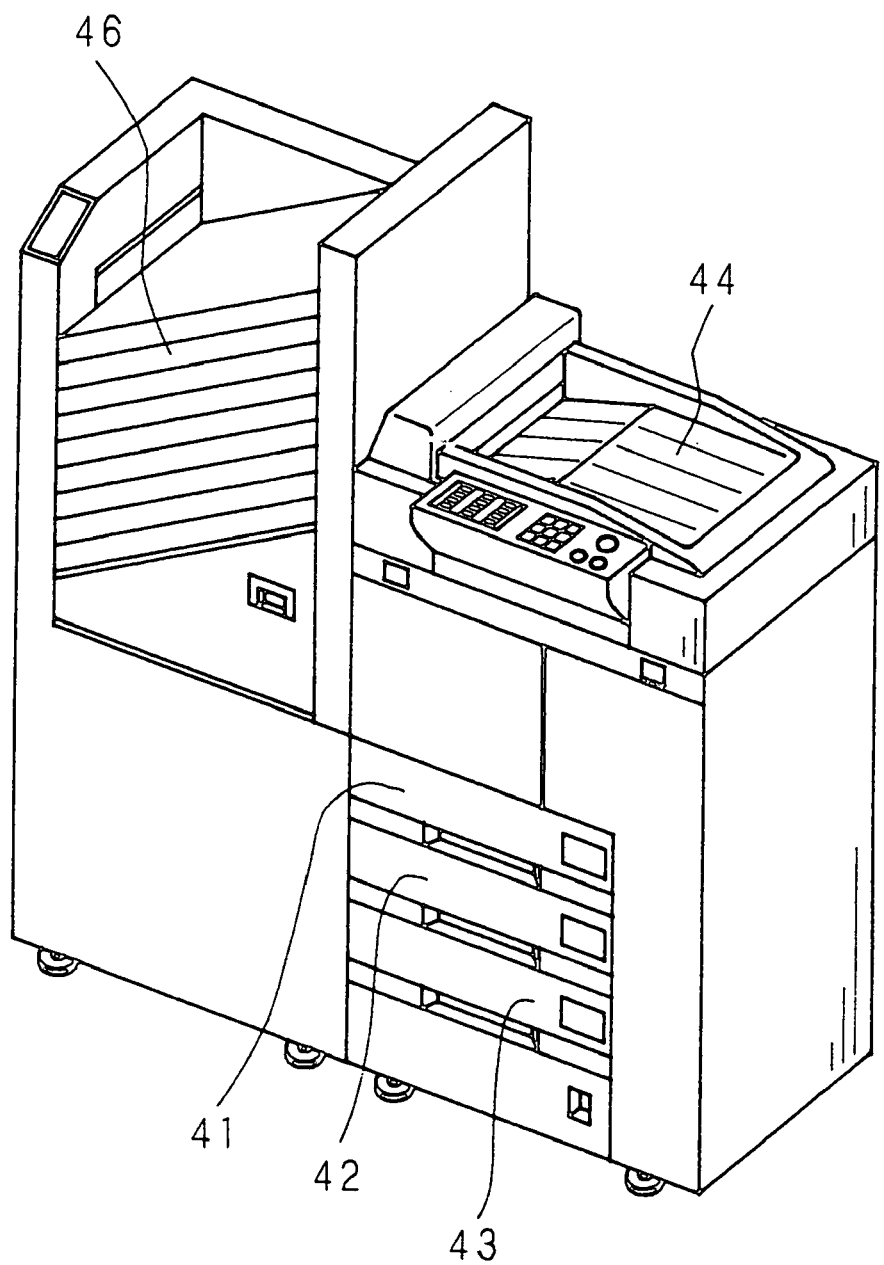
FIG. 5 is a perspective view showing the appearance of another embodiment of the printing apparatus according to this invention.

FIGS. 4 and 5 are perspective views showing the appearance of the printing apparatus according to this invention. In either one of the embodiments shown in FIGS. 4 and 5, the printing apparatus is equipped with three types of paper feeder hopper, namely, an upper hopper 41, a middle hopper 42, and a lower hopper 43, in which paper of different sizes are stored. In the embodiments shown in FIGS. 4 and 5, the paper discharge outlets of printed paper are different. In the embodiment shown in FIG. 4, a large capacity stacker 45 is equipped in addition to a tray 44 on the main body, while in the embodiment shown in FIG. 5, a multi-bin stacker 46 is equipped in addition to the tray 44. Though it is not illustrated, a large-capacity hopper may be equipped in addition to the hopper in three-layer construction.

In the printing apparatus according to this invention, because the print requests from all the host devices are simultaneously received and processing of the print requests is controlled in parallel, these print requests are controlled by the print queue. Now description will be made on this queue control.

Figure 6:
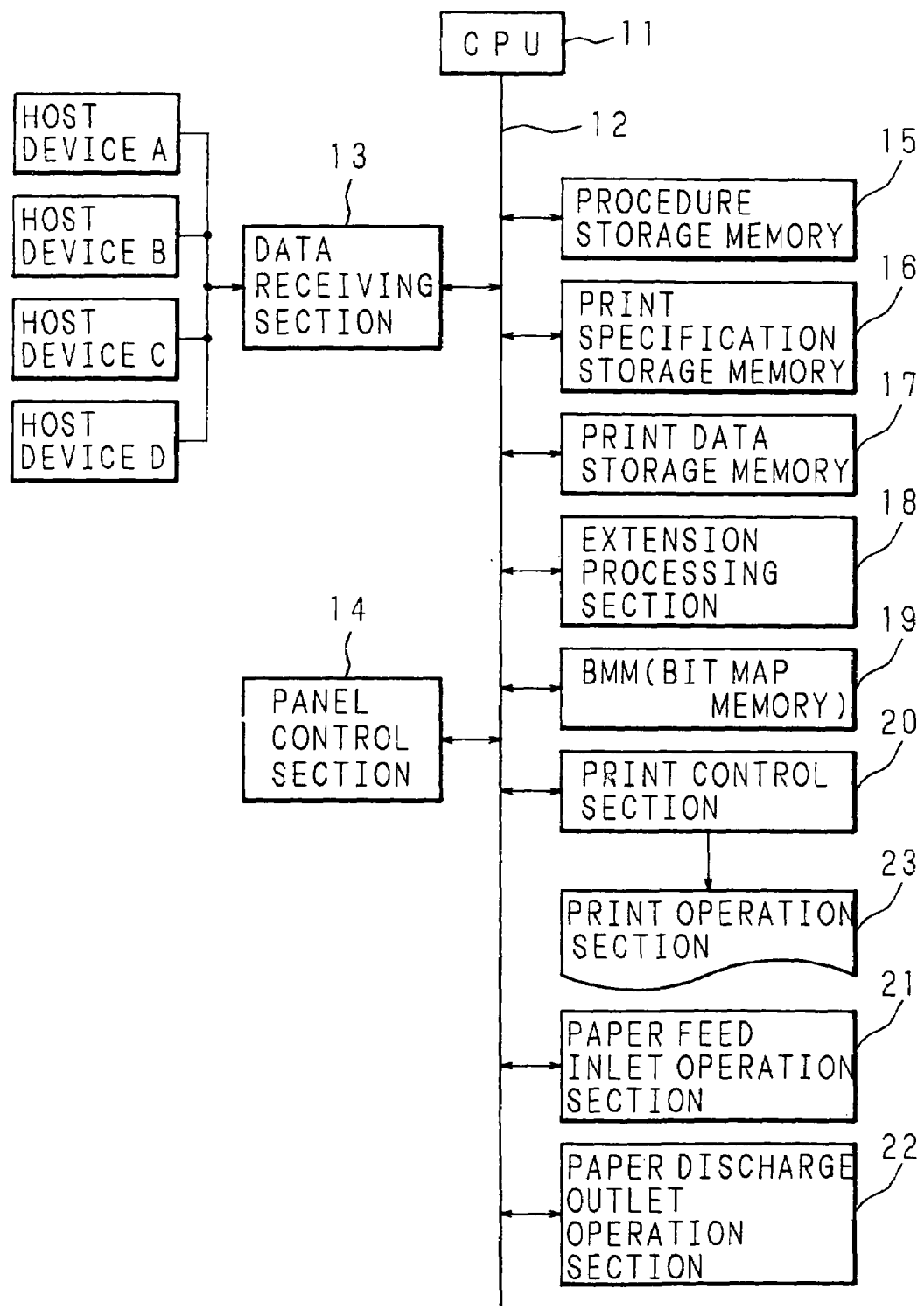
FIG. 6 is a block diagram showing the configuration of the printing apparatus according to this invention.

FIG. 6 is a block diagram showing the construction of the printing apparatus according to this invention. In FIG. 6, numeral 11 is a CPU, to which a data receiving section 13 which receives print data from a plurality of host devices (in this embodiment, four host devices A, B, C, D) and a panel control section 14 which controls display in the operation panel are connected via a data bus 12. To the data bus 12, a procedure storage memory 15, a print specification storage memory 16, a print data storage memory 17, an extension processing section 18, BMM (bit map memory) 19, a print control section 20, a paper feed inlet operation section 21, and a paper discharge outlet operation section 22 are connected. To the print control section 20, a print operation section 23 which carries out actual printing operation is connected.

Figure 7:
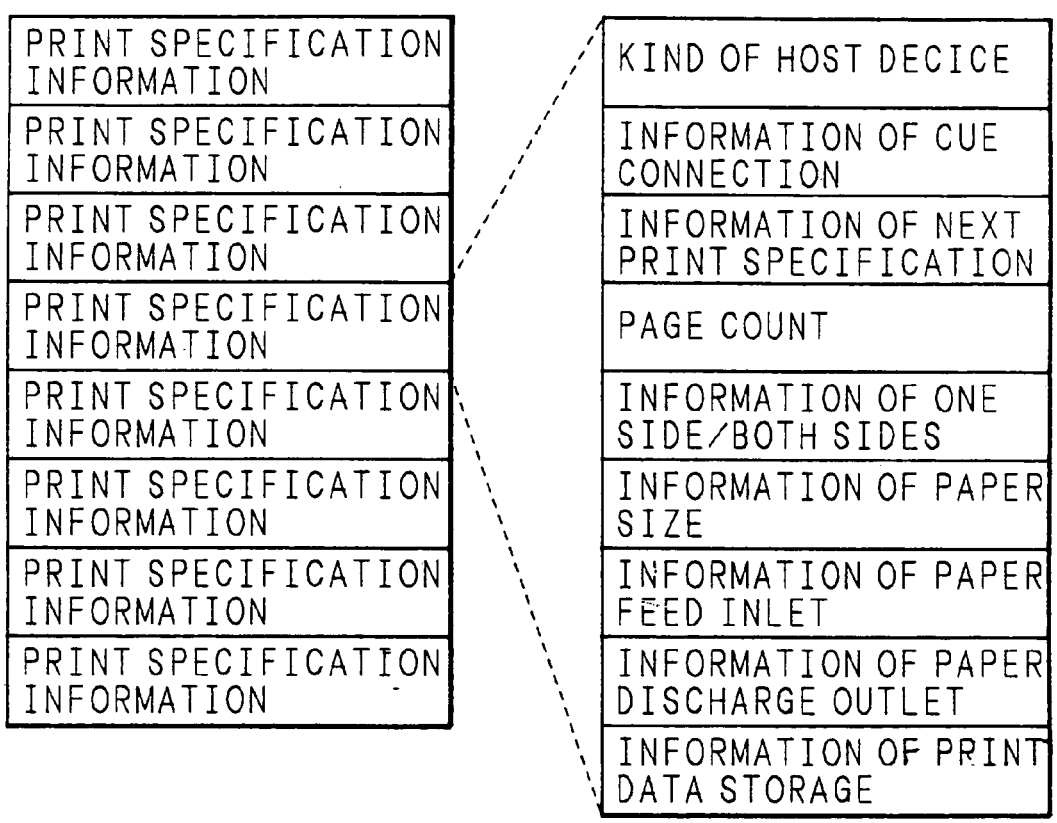
FIG. 7 is a view showing the print specification information region in the printing apparatus according to this invention.
Figure 8:
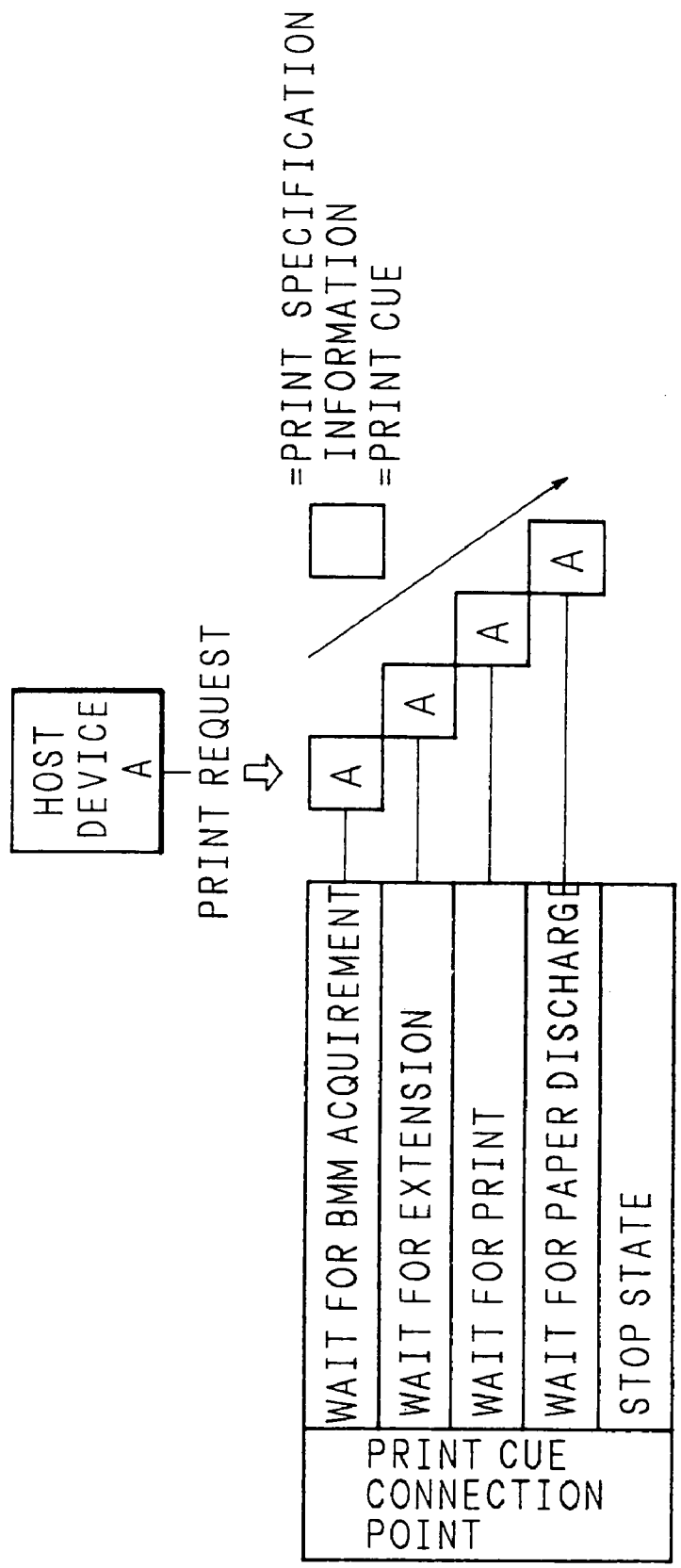
FIG. 8 is a view showing the order of printing queue connection during a series of printing operation in the printing apparatus according to this invention.

In the print specification storage memory 16 shown in FIG. 6, the print specification information region shown in FIG. 7 is provided for each logical printer paper (page) and when a print request is inputted from the host device, this print specification information is controlled as a print queue. That is, in each logical printer of the printing apparatus, the print request is controlled at print specification information and treated as a print queue. In the procedure storage memory 15 shown in FIG. 6, wait for BMM acquirement, wait for extension, wait for paper discharge, and stop state are provided as the print queue connection point shown in FIG. 8, and the print queue is connected to these connection points successively in accordance with each processing to control the printing operation.

Figure 1:
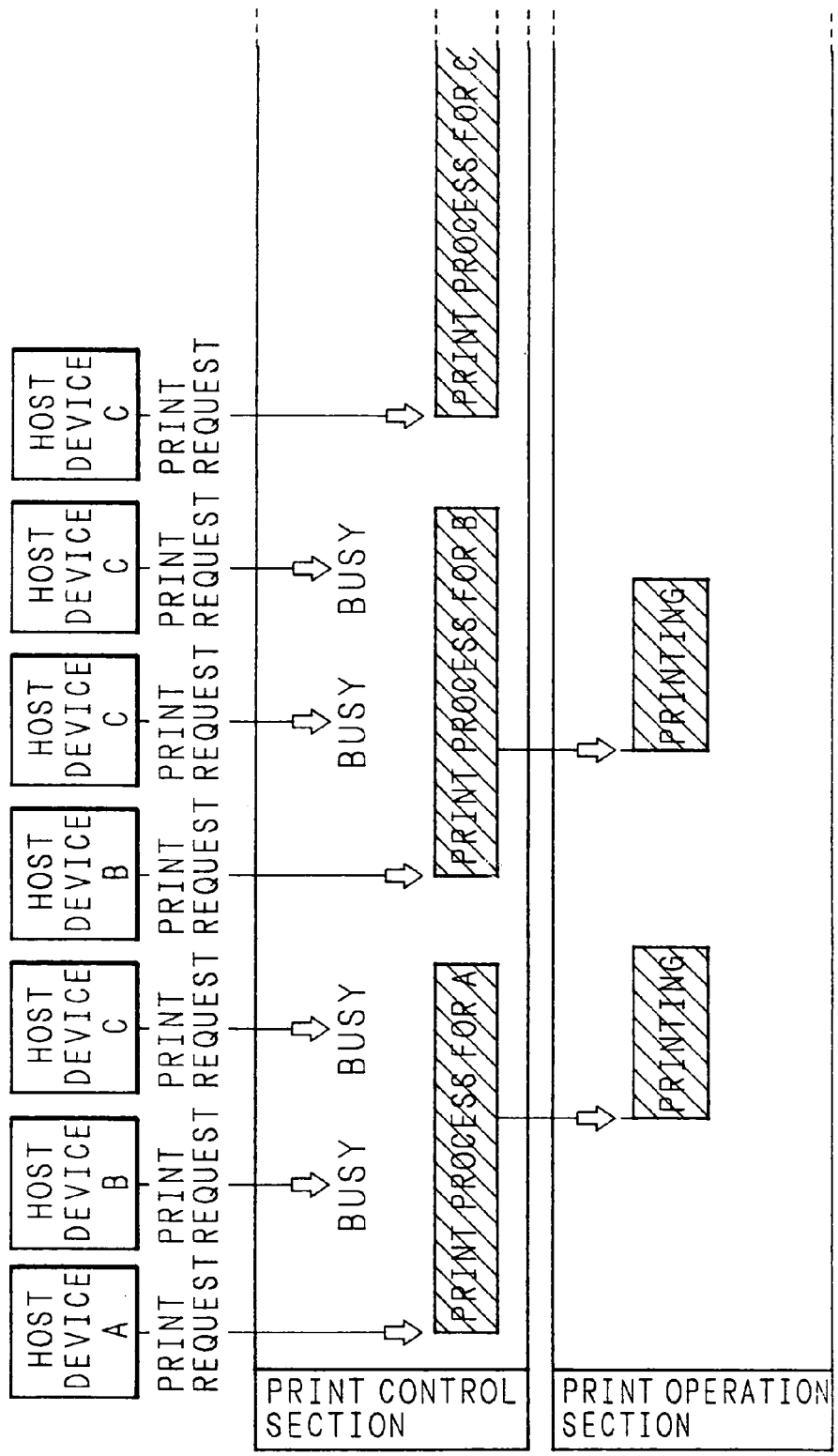
FIG. 1 is a view showing an outline of an operational pattern of the conventional printing apparatus.
Figure 2:
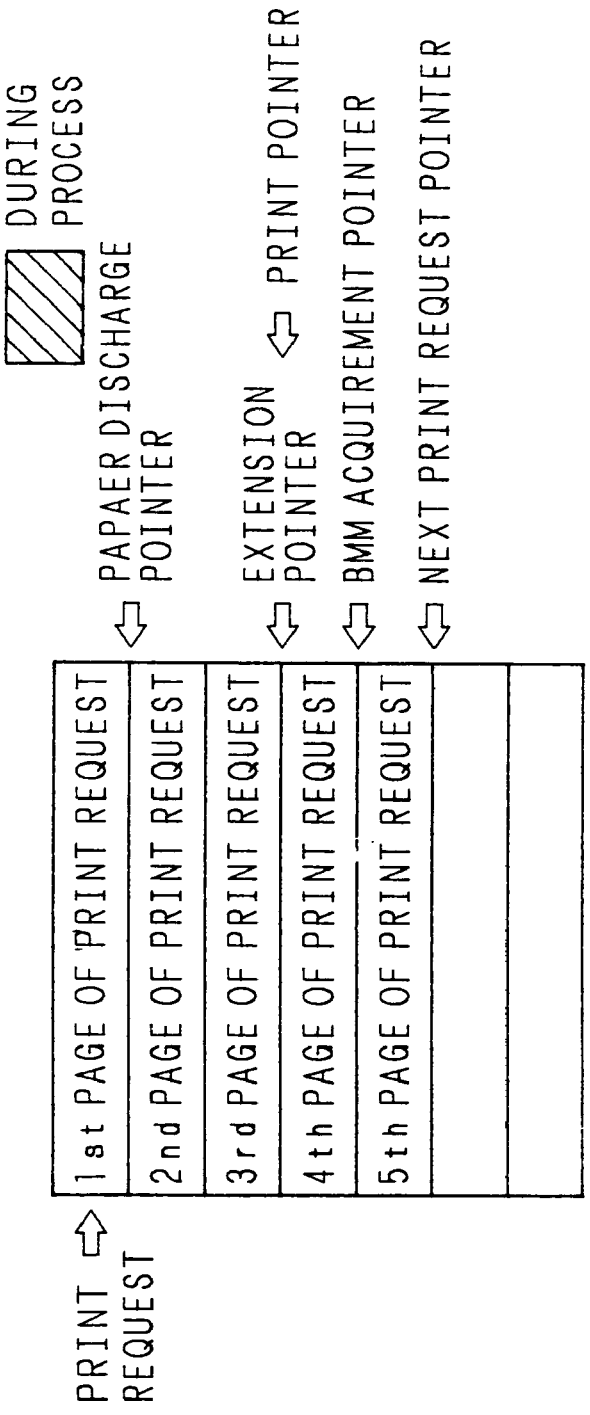
FIG. 2 is a view showing a control method of a print request in the conventional printing apparatus.
Figure 9:
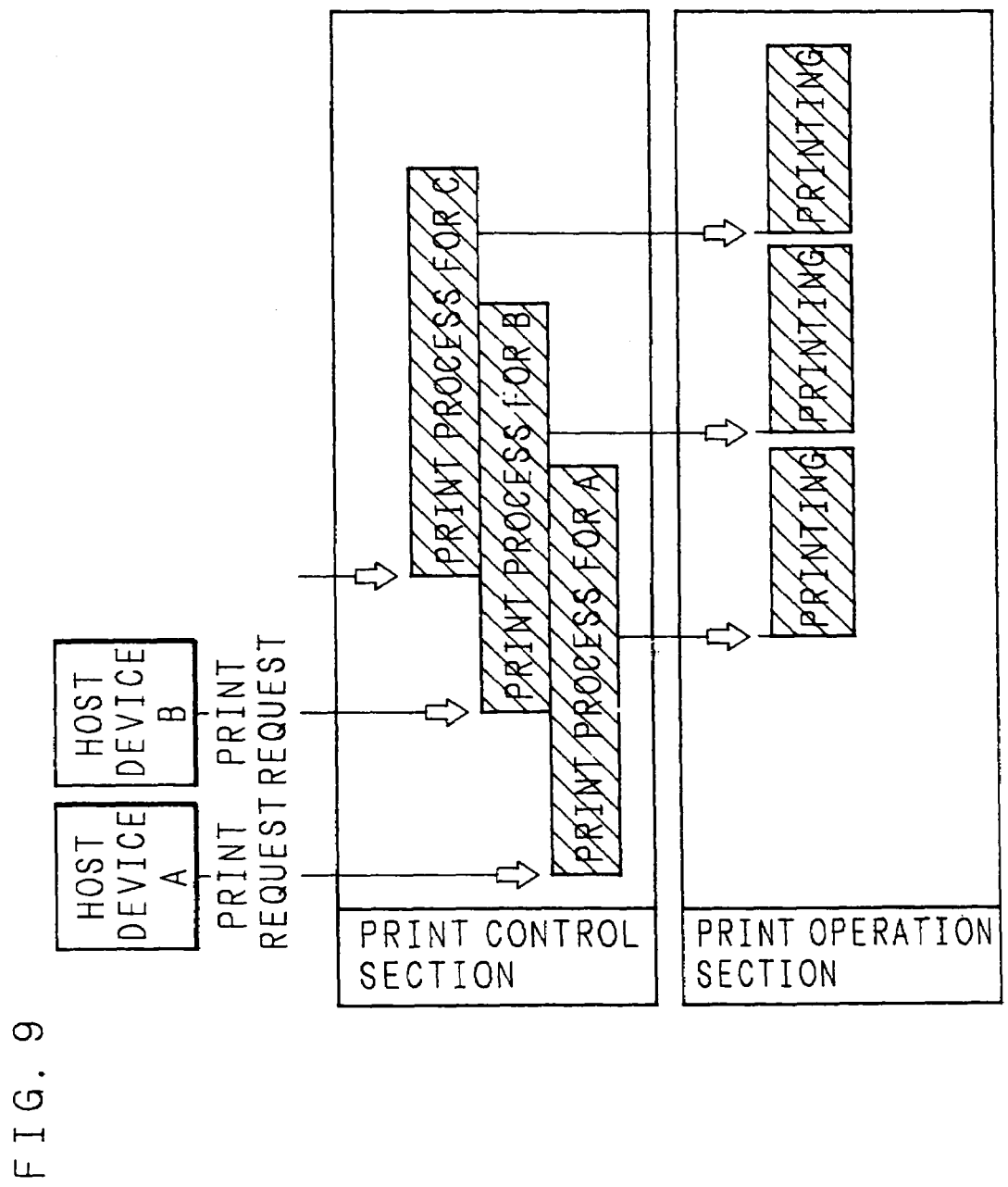
FIG. 9 is a view showing an outline of an operational pattern of the printing apparatus according to this invention, FIGS. 10A, B, C are views showing examples of a printing queue connection when printing is stopped and resumed in the printing apparatus according to this invention, FIGS. 11A and B are flow charts showing the procedure for normal print process in the printing apparatus according to this invention.

Controlling the print request by the print queue facilitates changes of the order of print request among logical printers and enables control of the print request for every host device. With this design, in the printing apparatus of this invention, even while the print request from one host device is being processed by a logical printer, it is possible to receive the print request from another host device with another logical printer, achieving simultaneous receipt of print requests from a plurality of host devices. Accordingly, the operation in the printing apparatus of this invention can be illustrated as shown in FIG. 9, in which print requests from three host devices A, B, C are processed in parallel unlike the conventional example shown in FIG. 1.

Figure 10C:
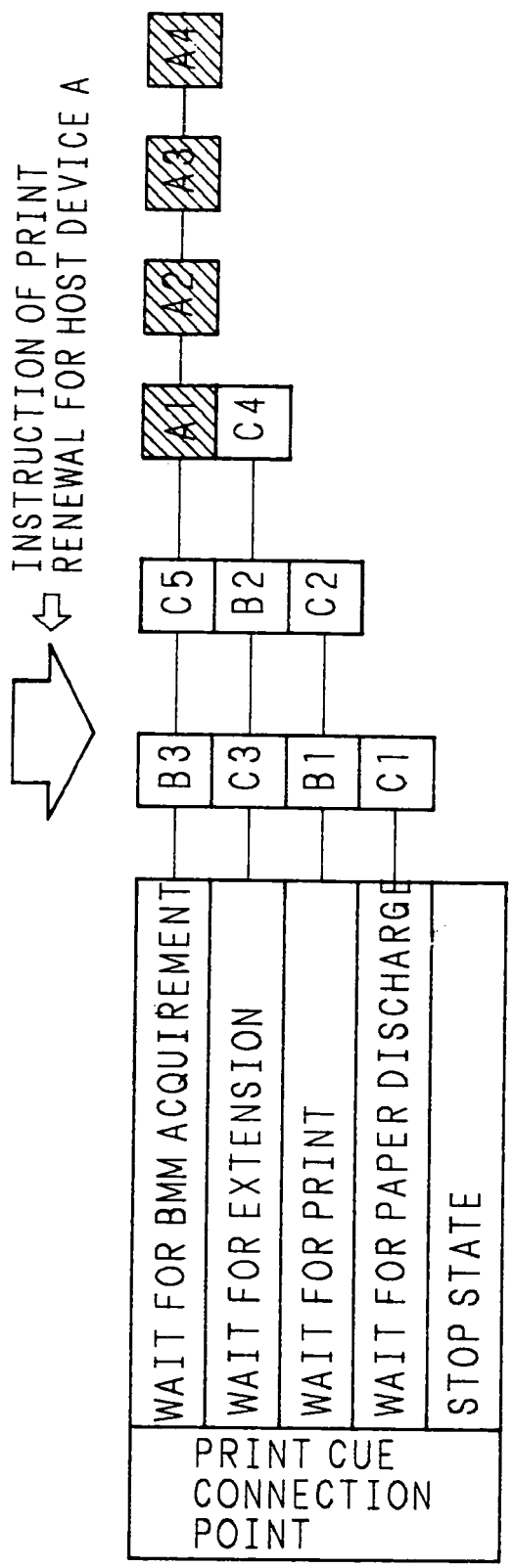

Now referring to FIG. 10, description will be made on the print queue control when printing is resumed after printing of one host device of a plurality of host devices is temporarily stopped upon receiving a print request from a plurality of host devices. Presently, as shown in FIG. 10A, print requests are sent from three types of host devices A, B, C and are connected to the print queue connection point, page by page, for each print request. When printing only of the host device A is to be stopped, all the print queue of the host device A connected to each print queue connection point (in this embodiment, wait for paper discharge, wait for print, and wait for BMM acquirement) are taken out and all of these are connected to the print queue connection point in the stop state and printing of the host device A is stopped. Thereafter, when printing of the host device A is to be resumed, the print queue of the host device A connected to the print queue connection point in the stop state should be connected to the print queue connection point under wait for BMM acquirement as shown in FIG. 10C.

To be concrete, when the print operation section is in the print enable condition and only the A4 paper is contained in a hopper, and if the paper size required by the print request of the host device A is A3 size and that required by the print request of host devices B, C is A4 size, respectively, in the similar manner as when printing only of the host device A is stopped as described above, printing of other host devices B, C can be continuously carried out by connecting the print request of the host device A to the print queue connection point in the stop state.

Figure 11A:
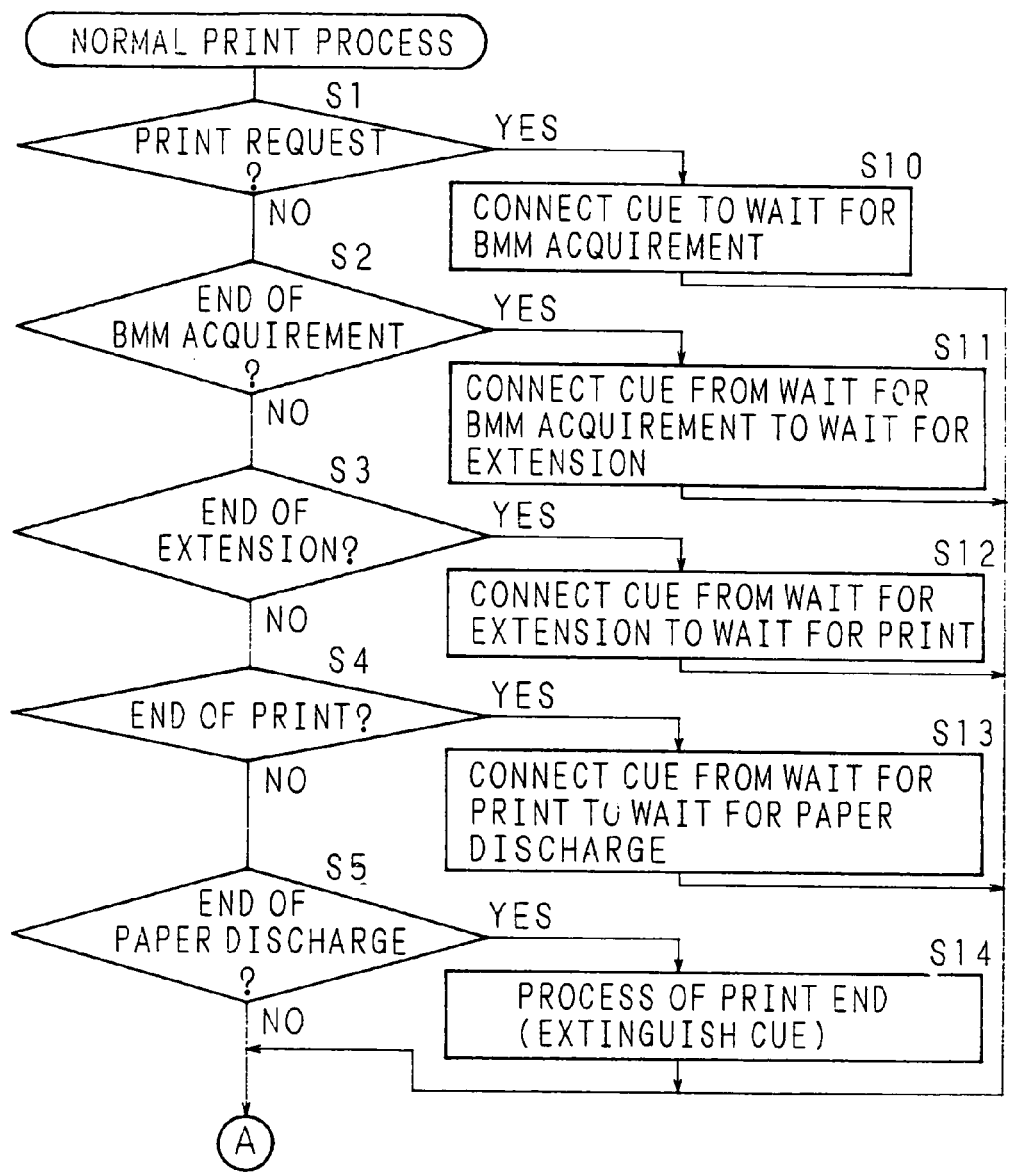
Figure 11B:
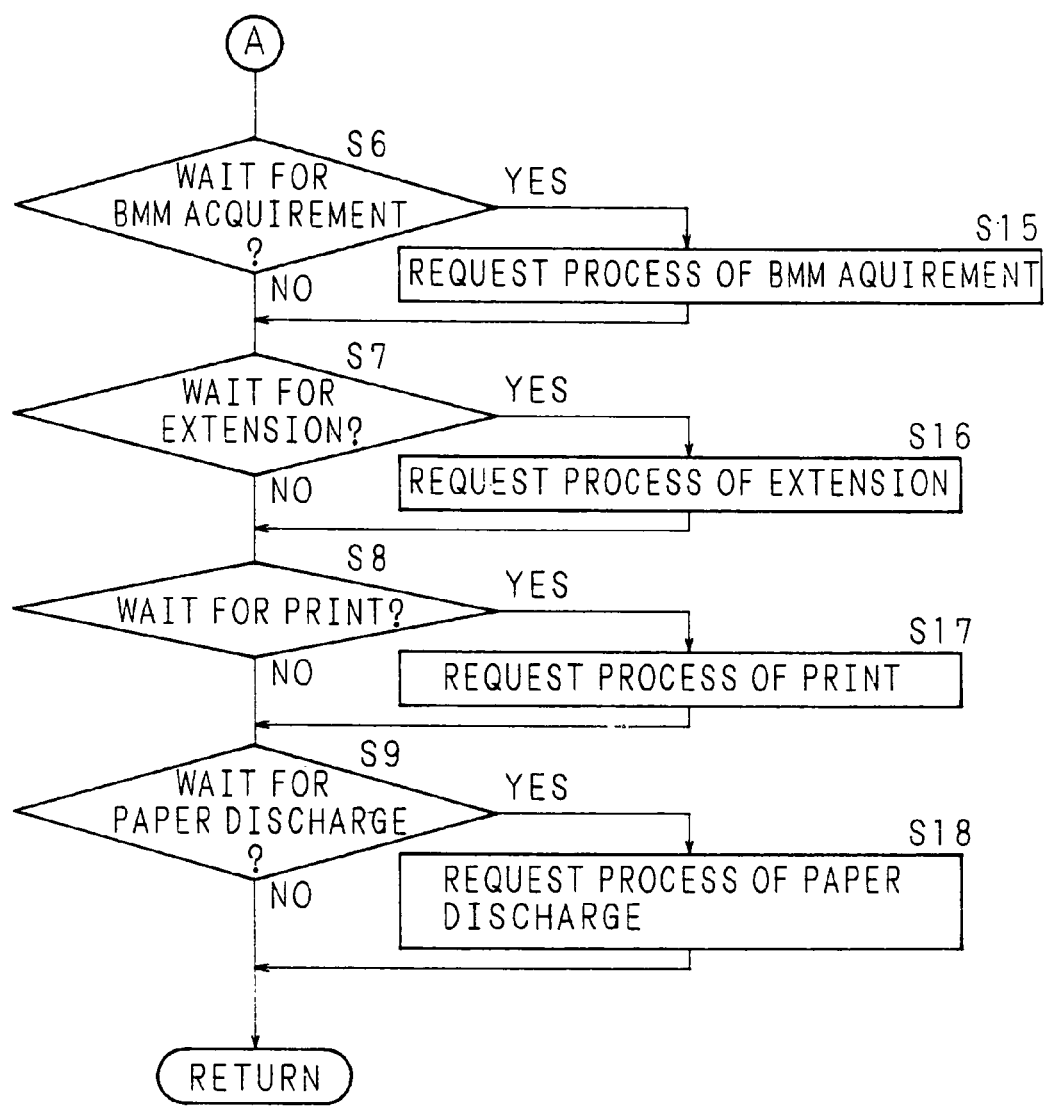

FIG. 11 is a flow chart showing the procedure for changing connection of print queue under normal condition. At Step S1, whether the print request comes from the host device or not is judged, and if the print request comes, the print queue is connected to BMM acquirement (Step S10) and the procedure advances to Step S6, and if it does not come, the procedure advances to Step S2. At Step S2, whether the BMM acquirement is completed or not is judged and if it is completed, the print queue is reconnected to the wait for extension (Step S11), and the procedure advances to Step 6. If it is does not completed, the procedure advances to Step S3. At Step S3, whether extension is completed or not is judged, and if it is completed, the print queue is reconnected to the wait for extension from the wait for BMM acquirement (Step S12), and the procedure advances to Step S6, and if it is not completed, the procedure advances to Step S4. At Step S4, whether print is finished or not is judged, and if it is finished, the print queue is reconnected from the wait for print to the paper discharge (Step S13), and the procedure advances to Step S6, and when it is not completed, the procedure advances to Step S5. At Step S5, whether paper discharge is finished or not is judged, and if it is finished, a series of print process are terminated and extinguishes the print queue (Step S14), and the procedure advances to Step S6, and if it is not terminated, the procedure advances to Step S6 as it is.

At Step S6, whether the print queue stays at the wait for BMM acquirement is judged, and if it stays, the BMM acquirement processing is requested (Step S15), and the procedure advances to Step 7, and if it does not stay, the procedure advances to Step S7 as it is. At Step S7, whether the print queue stays at the wait for extension is judged, and if it stays, the extension processing is requested (Step S16), and the procedure advances to Step 8, and if it does not stay, the procedure advances to stop S8 as it is. At Step 8, whether the print queue stays at the wait for print is judged and if it stays, the print processing is requested (Step S17) and the procedure advances to Step S9, and if it does not exist, the print due allows to advance to Step S9. At Step S9, whether the print que stays at the wait for paper discharge is judged, and if it stays, the paper discharge processing is requested (Step S18) to return, and if it does not stay, the procedure returns as it is.

In the operation procedure shown in the flow chart in FIG. 11, when the print request comes from the host device, YES results by the judgment at Step S1, connecting the print queue to the wait for BMM acquirement. Then, YES results by the judgment at subsequent Step S6, requesting the BMM acquirement processing. When the BMM acquirement processing is completed, YES results by the judgment of Step S2 and the print queue is reconnected from the wait for BMM acquirement to the wait for extension. Then, YES results in at the subsequent judgment of Step S7, requesting the extension processing. Thereafter in the same manner, in the order shown in FIG. 8, the print queue is reconnected successively and the process corresponding to each connection point is requested to control printing operation.

Figure 12:
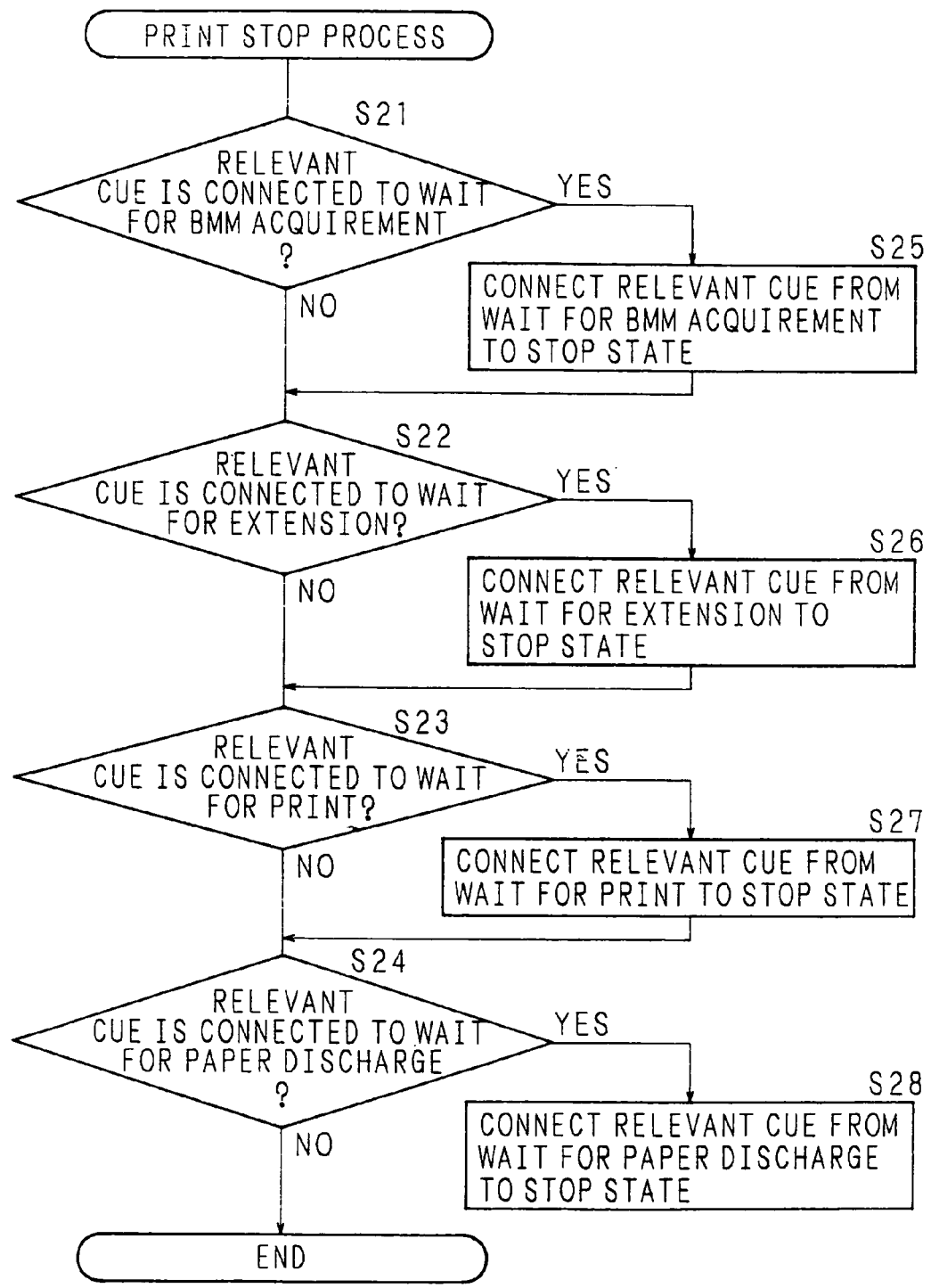
FIG. 12 is a flow chart showing the procedure for print stop process in the printing apparatus according to this invention.

FIG. 12 is a flow chart showing the reconnecting procedure when printing only of one host device is stopped. At Step S21, the print queue of the host device (hereinafter called the "relevant queue") is judged for whether it is connected to the wait for BMM acquirement, and if it is connected, the procedure advances to Step S22 after it is reconnected to the stop state (Step S25) or as it is when it is not connected. At Step 22, the relevant queue judged for whether it is connected to wait for extension, and if it is connected, the procedure advances to Step S23 after it is reconnected from the wait for extension to the stop state (Step S26) or as it is when it is not connected. At Step S23, the relevant queue is judged for whether it is connected to the wait for print, and if it is connected, the procedure advances to advance to Step S24 after it is reconnected from the wait for extension to the stop state (Step S27) or as it is when it is not connected. At Step S24, the relevant queue is judged for whether it is connected to the wait for paper discharge, and if it is connected, the relevant queue ends the process after it is reconnected from the wait for paper discharge to the stop state (Step S28) or as it is when it is not connected.

In the operation procedure shown in the flow chart of FIG. 12, a print queue requested by the host device which is selected to stop printing and connected to the connection point other than the stop state is found out and all of them are reconnected to the print queue connection point in the stop state so that printing only of specific host devices is stopped.

As described above, print requests from host devices are controlled by the queue at each logical printer. Therefore, when the print data is received from a plurality of host devices, even while the print data from one host device is being processed, the print data from other host devices can be received. It also becomes easy to stop printing process only of the specific host device, and it becomes possible to process print requests of other host devices (logical printers) even when the paper of the size required by one host device (logical printer) runs out. As a result, it is possible to contribute to the improvement of throughput put of the printing apparatus as well as to reduce the load of host devices.

Next discussion will be made on the method to specify on an operation panel an optional combination of a virtual paper feed inlet and a paper discharge outlet (logical hopper and logical stacker) which each logical printer possesses with a paper feed inlet and a paper discharge outlet actually provided in the printing apparatus (physical hopper and physical stacker).

The printing apparatus according to this invention has maximum 4 paper feed inlets including an upper hopper 41, a middle hopper 42, a lower hopper 43, and a large-capacity hopper (not illustrated) as paper feed inlets as shown in FIGS. 4 and 5 described before, and has a plurality of paper discharge outlets including a tray 44, a large-capacity stacker 45, and a multi-bin stacker 46 as paper discharge outlets.

Figure 13:
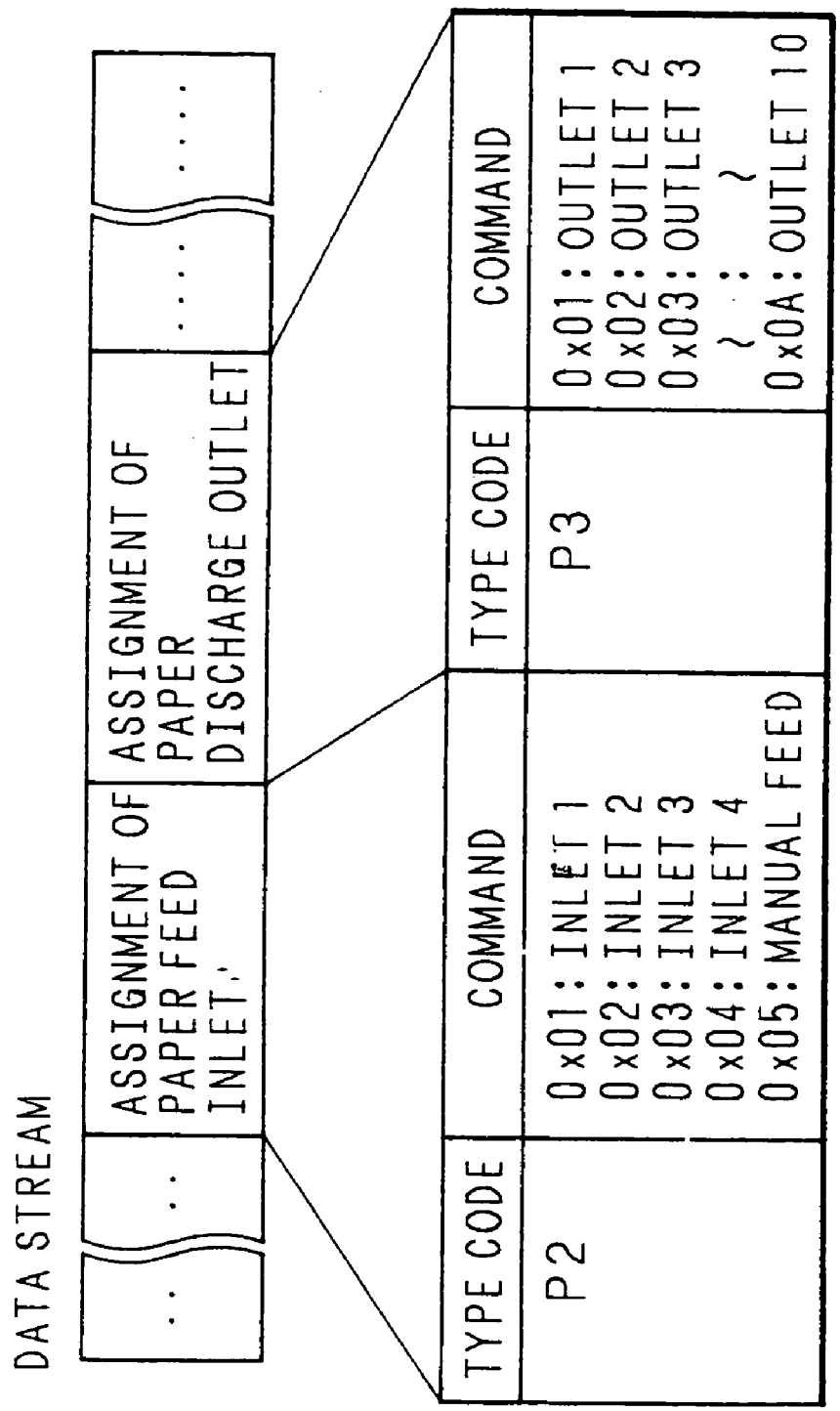
FIG. 13 is an illustration assigning a paper feed inlet and discharge outlet from a host device in the printing apparatus according to this invention, FIGS. 14 A, B, C are illustrations assigning the paper feed inlet from an operation panel in the printing apparatus according to this invention.

FIG. 13 is an explanatory illustration to assign a paper feed inlet and paper discharge outlet from a host device. In a data stream from a host device, codes to assign a specific paper feed inlet and paper discharge outlet are contained and the codes are decoded on the printing apparatus side to assign the paper feed inlet and paper discharge outlet. The method to assign a paper feed inlet and paper discharge outlet from host devices shown in FIG. 13 is the same as that of the conventional printing apparatus. In this invention, this conventional assignment method is utilized as it is, that is, the operator is allowed to optionally assign the paper feed inlet and paper discharge outlet of each logical printer without changing the application from the host device.

FIGS. 14A, B, C are explanatory illustrations to assign the paper feed inlet from the operation panel. As shown in FIGS. 14A, B, C, a screen in which definition of each paper feed inlet is carried out from the operation panel 31 is provided, and when the paper feed inlet is defined, the paper feed inlet assignment screen (FIG. 14A) is selected. On this screen, the paper feed inlet is successively displayed by pressing the select key and the paper feed inlet to be defined is selected. Each paper feed inlet on this screen corresponds to each command assigned in the codes in the data stream of FIG. 13.

Then, pressing the set key upon completion of selection causes the transition from the paper feed inlet assignment screen to the screen for assigning each paper feed inlet (FIG. 14B). Pressing the up key at this moment causes the display below the cursor to repeatedly change from o to—and from—to o every time the up key is pressed. Here, o indicates definition and—indicates no definition. Pressing the set key after selecting o in defining and after selecting—in not defining fixes the assignment. Pressing the right key moves the cursor indication successively from upper, then, to middle, lower, large-capacity, and upper inlets, and using this right key, the paper feed inlet for which definition or no definition is switched is assigned, and using the up key, definition or no definition is assigned. The upper, middle, lower, and large-capacity inlets on this screen are physical paper feed inlets shown in FIGS. 4 and 5.

When operation is finished, press the set key to fix the assignment. Depressing this set key stores the assigned patterns in the control table (FIG. 14C). This kind of paper feed inlet assigning screen is prepared for each logical printer so that definition of the paper feed inlet pattern can be changed for each logical printer.

FIG. 15 is a flow chart showing a procedure to determine a paper feed inlet based on the command (data stream) from the host device and the definition of the paper feed inlet assigned on the operation panel. First of all, the information of paper feed inlet assignment contained in the data stream from the host device is inputted (Step S31). For example, if 0x01 is assigned in the data stream, the paper feed inlet assigned in this case is the paper feed inlet 1. Next, referring to the control table as shown in FIG. 14C, the definition state of the paper feed inlet assigned in the data stream is examined (Step S32). In the control table shown in FIG. 14C, a upper hopper and a large-capacity hopper are defined for the paper feed inlet 1. Ant in accordance with the definition state, the paper feed inlet is determined and print is requested. To be concrete, by this definition, the upper hopper and the large-capacity hopper is assigned to the paper feed inlet for the printing request in this case. The data stream from the host device shown in FIG. 13 contains assignment of manual feed in the assignment of paper feed inlets, but in the assignment of paper feed inlets in logical printers, there is no mode for assigning the manual feed. However, if this manual feed assignment is defined as, for example, the upper hopper beforehand in the aforementioned definition processing, the upper hopper is assigned when the manual feed is assigned, causing no problem.

Figure 16A:
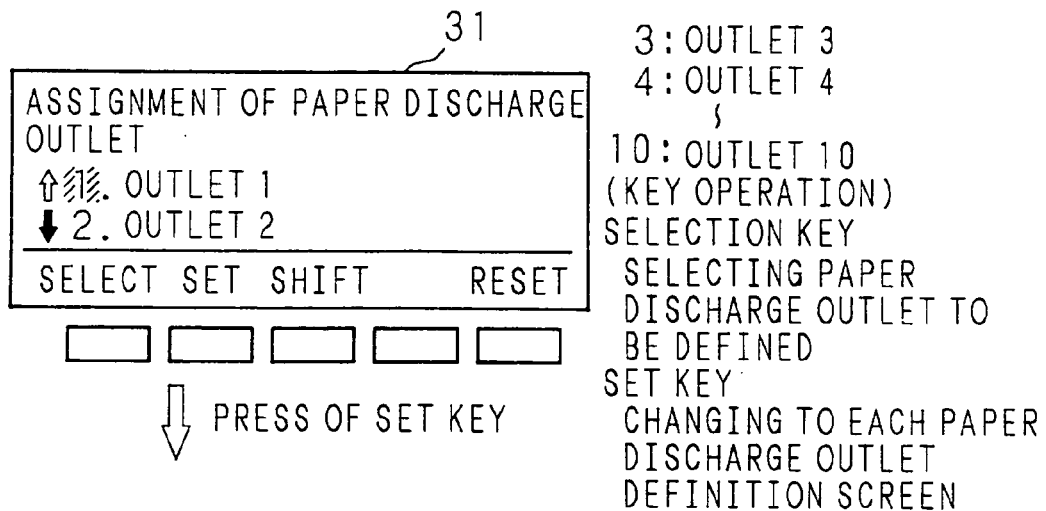

FIGS. 16A, B, C are explanatory illustrations for assigning the paper discharge outlets from the operation panel. The paper discharge outlets are assigned in the same manner as that for paper feed inlets described above. As shown in FIGS. 16A, B, C, a screen in which definition of each paper discharge outlet can be carried out from the operation panel 31 is provided and when the paper discharge outlet is defined, the paper discharge outlet assigning screen (FIG. 16A) is selected. On this screen, the paper discharge outlet is successively displayed by pressing the select key and the paper discharge outlet to be defined is selected. Each paper discharge outlet on this screen corresponds to set value assigned in the codes in the data stream of FIG. 13.

Figure 16B:
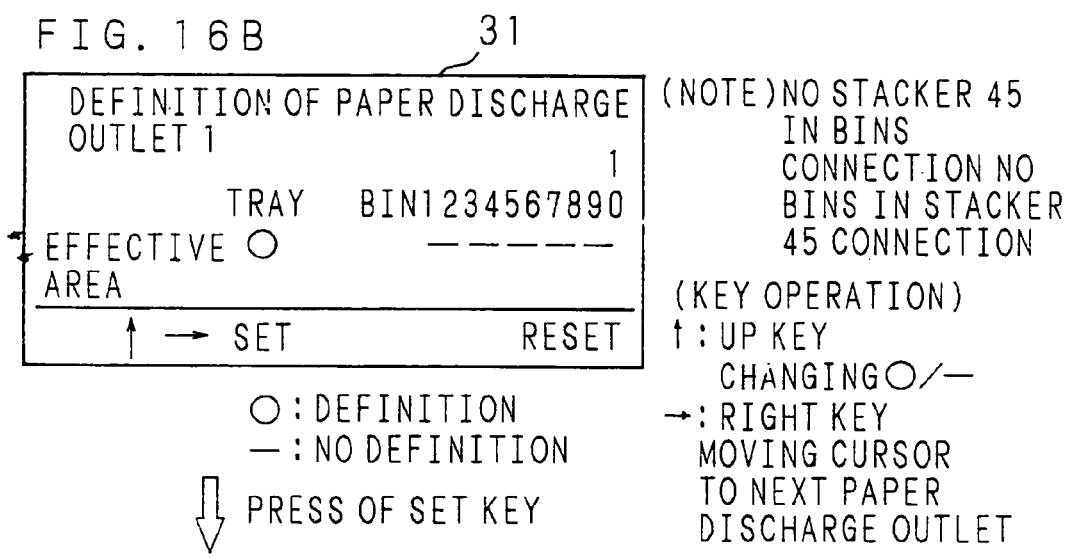

Then, pressing the set key upon completion of selection causes the transition from the paper discharge outlet assignment screen to the screen for assigning each paper discharge outlet (FIG. 16B). Depressing the up key and set key, in the same manner as in the case of the paper feed inlets described above, definition or no definition of each bin of the tray 44, stacker 45, and stacker 46 is assigned. However, to connect the stacker 46 equipped with 10 bins to the main body, the stacker 45 is not connected and conversely, when the stacker 45 is connected to the main body, the stacker 46 is not connected. Pressing the set key upon completion of the operation stores the assigned patterns in the control table (FIG. 16C). This paper discharge outlet assigning screen is also prepared for each logical printer so that the definition of paper discharge outlet pattern can be changed for each logical printer.

With the configuration described above, the operator is allowed to optionally assign paper feed inlets and paper discharge outlets on the printing apparatus side.

Because in the printing apparatus according to this invention, the print data is received from a plurality of host devices and printing is carried out at each logical printer simultaneously, printed matters from all logical printers may coexist at the same paper discharge outlet. In this event, it is quite troublesome to recognize which printed matter comes from which host device and to sort them according to each host device (logical printer). In order to prevent this coexistence of the printed matters, the printing apparatus should be designed so as to prevent overlapping the definition of paper discharge outlets in each logical printer. That is, the paper discharge outlet defined by one logical printer shall not be defined by other logical printer, and in this embodiment, definition on the operation panel is disabled.

In the printing apparatus according to this invention, a plurality of logical printer connected to each host device exist, but it is necessary for the operator to recognize the operation state of all the logical printers. In this invention, monitoring one screen of only one existing operation panel allows the operator to grasp the operation state of all the logical printers and to control these printers. Next description will be given on this control method.

Figure 17:
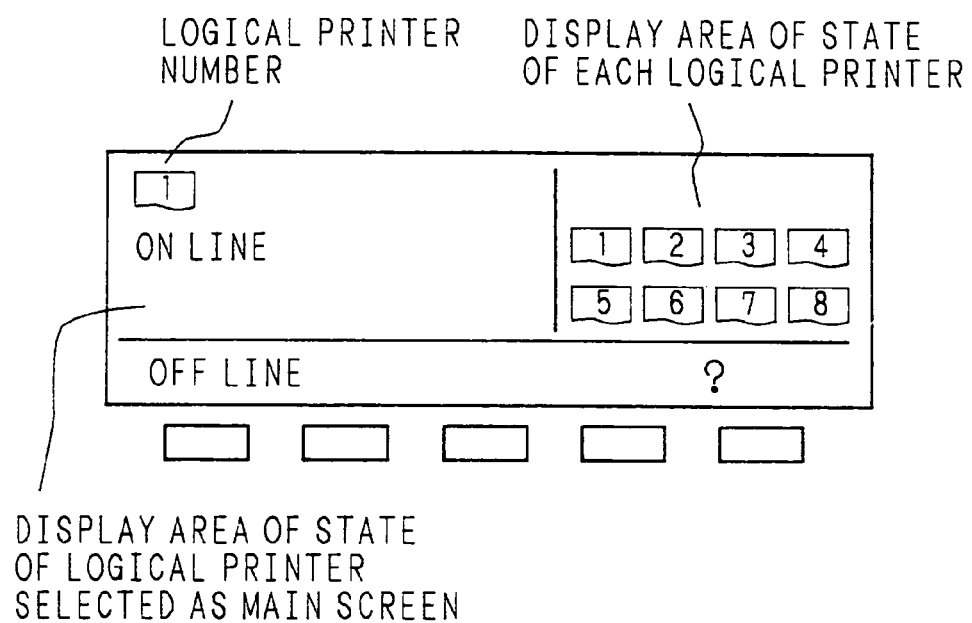
FIG. 17 is a view showing the main screen of the operation panel in the printing apparatus according to this invention.

As shown in FIG. 17, the main screen of the operation panel 31 is divided in a display area of state of logical printer selected as main screen which displays the operating state of the logical printer selected as the main screen and a display area of state of each logical printer which displays the operating state of each logical printer. The method for selecting a logical printer as a main screen will be discussed later. It is possible to easily notify the operator of the operating state of all logical printers on one operation panel 31 by indicating the operating state of each logical printer in the icon display as shown in FIG. 18 in the display area of state of each logical printer.

Figure 19:
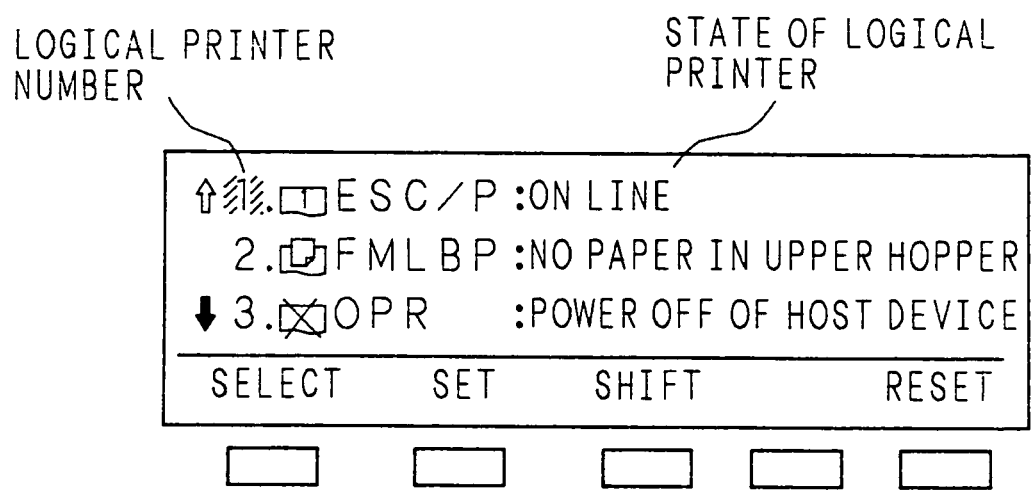
FIG. 19 is a view showing the detailed information screen of each logical printer condition of the operation panel in the printing apparatus according to this invention.

Now, when the operator wants to know a detailed operating state of each logical printer, pressing the ? key on the screen of FIG. 17 shifts the screen to the detailed information screen of each logical printer as shown in FIG. 19 and the detailed information of operating state of each logical printer is displayed on the line of the logical printer number. Pressing the select key successively displays the detailed information on operating condition of each logical printer. If the display area of this information is too narrow, the information is displayed by a flowing message.

Next, a method for selecting a logical printer to be displayed as a main screen will be discussed. This selection is made on the screen display shown in FIG. 19. Pressing the select key successively changes the logical printer number below the cursor. Then, selecting the logical printer number to be selected and pressing the set key enables switching of the logical printer to be displayer as a main screen.

Because each paper feed inlet and paper discharge outlet assigned by the host device is defined by the operation panel, the operator can optionally assign the paper feed inlet and paper discharge outlet without changing the application from the host device. Because the operating state of all the logical printers are iconed and tabulated for display on one operation panel as well as the detailed operating state of each logical printer which is selectively displayed, it is possible to control all the logical printers on one operation panel even if an operation panel is not provided for every logical printer.

In the printing apparatus according to this invention, processing the print data from any of the host devices as the priority print data and carrying out the printing preferentially expedites the completion of the print data transmission from the specific host device with priority given so that the operation efficiency of the specific host device is improved. Now, description will be given on the processing of this priority printing.

In order to assign printing of specific host devices to priority printing, in this invention, the print data transmitted from a plurality of host devices are divided into priority print data which will be printed preferentially and normal print data. In this event, there is a case in which a command indicating priority printing is transmitted together with the print data from host devices or there is also a case in which designation is made on the operation panel on the printing apparatus side with respect to which print data of host devices should be preferentially printed. The information indicating which print data is the priority print data is stored in the memory of CPU 11 which controls writing and reading of the print data storage memory 17 (see FIG. 6).

In the printing apparatus according to this invention, the area for storing this priority print data is provided in advance in the print data storage memory 17. As a configuration of the buffer area in the print data storage memory 17, there are one which is constructed with a plurality of blocks of a fixed size and one which is constructed with one memory pool. In the description below, processing of priority printing will be described for each configuration example of these two types of buffer areas.

FIG. 20 is a schematic diagram of buffer area (print buffer control table constructed with a plurality of blocks of a fixed size. In FIG. 20, the blocks after the top position indicated with the start pointer of priority print blocks (hatched blocks) are the buffer area for priority printing which stores the priority print data only. At this point, how many blocks are allotted to the buffer area for priority printing can optionally be set on the operation panel. In the print buffer control table shown in FIG. 20, the use state (whether stored or vacant) is recognized by the in-use flag.

Figure 21:
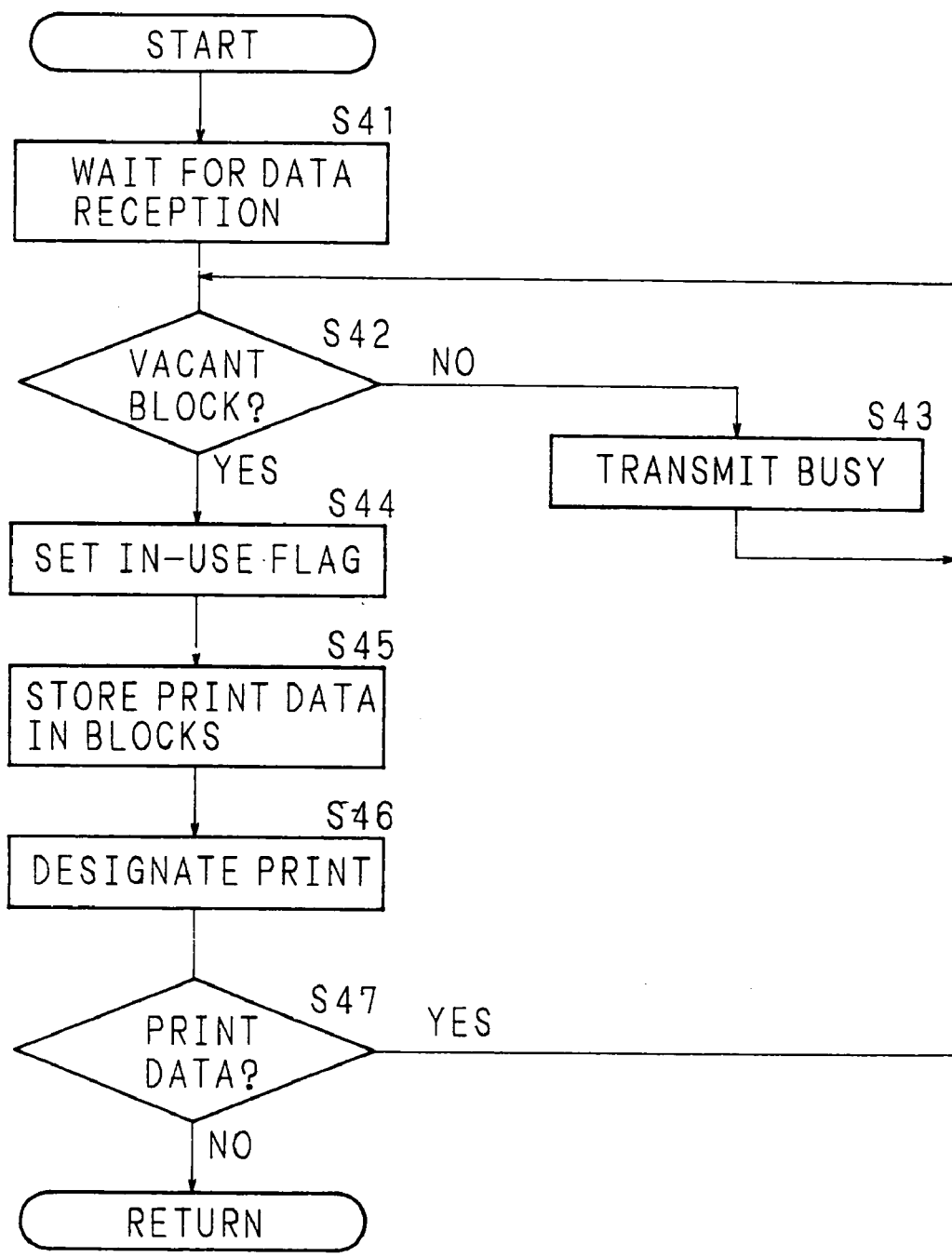
FIG. 21 is a flow chart showing the operation procedure of normal and priority printing in the printing apparatus according to this invention.

Now, referring to the flow chart of FIG. 21 indicating the processing procedure, the operation will be described. When the print data is transmitted from host devices, "wait for data reception" is started at Step S41. Then, the vacant block which can be used is retrieved (Step S42). In the case of normal printing, in the area from the top block of the print buffer control table to the block right before the one the start pointer of priority print block points, each one of in-use flags is retrieved to find a vacant block, and in the case of priority printing, each one of in-use flags is retrieved over the whole area from the top block to the last block of the print buffer control table to find a vacant block.

If no vacant block is found, after BUSY is transmitted to the host device (Step S43), the procedure returns to Step S42 to search for a vacant block again. If a vacant block is found, it sets an in-use flag of the block (Step S44). And the print data is stored in the retrieved vacant block (print buffer) (Step S45). Here, the print data is stored until the print data is completed or the vacant block is filled. Then, the print designation is transmitted to the print control section 20 (Step S46). It is judged whether the received print data remains or not (Step S47), and if any print data remains, the procedure comes back to Step S42, and if no print data remains, the procedure returns.

Figure 22:
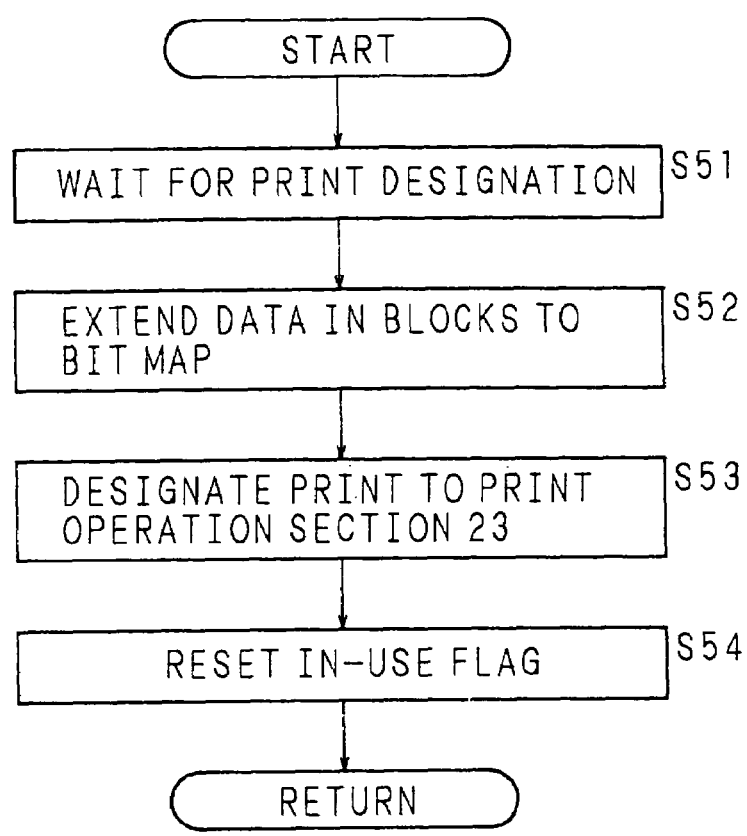
FIG. 22 is a flow chart showing the operation procedure of print process in the printing apparatus according to this invention.

FIG. 22 is a flow chart, showing the operation procedure of the print control section 20 which controls the print operation section 23 after receiving the print assignment. When the vacant block is filled with print data or all the received print data is stored in the block (print data storage memory 17), processing is started at Step S51 by the print designation from Step S46. The print data stored in the block is analyzed and extended to bit map (Step S52). If the stored print data is already extended to bit map, this processing is not needed. Next, the print designation is given to the print operation section 23 (Step S53) and the in-use flag is reset (Step S54), and the procedure returns. In this event, when the print data is warranted, this reset processing shall be carried out after outputting the print results. If there is no need for warranting the print data or the print data is warranted on the host device side, this reset processing may be carried out right after Step S52.

Figure 23:
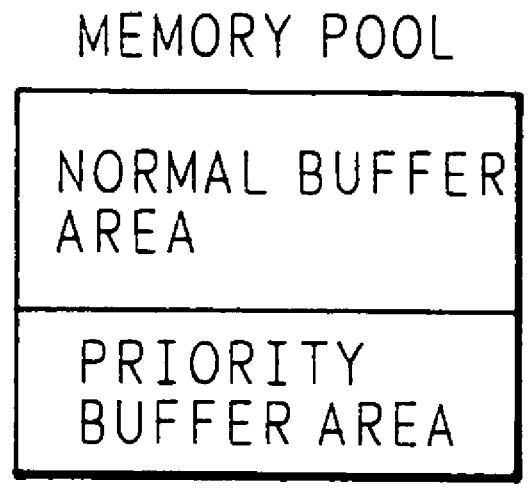
FIG. 23 is a schematic diagram of memory pool in the printing apparatus according to this invention.

Next description will be made on the case in which the print data storage memory 17 is constructed by one memory pool. FIG. 23 is a schematic diagram of this memory pool, which is generally divided into a normal buffer area which stores normal print data and priority print data and a priority buffer area which stores priority print data only. The ratio of these two buffer areas can be optionally set from the operation panel.

Figure 24:
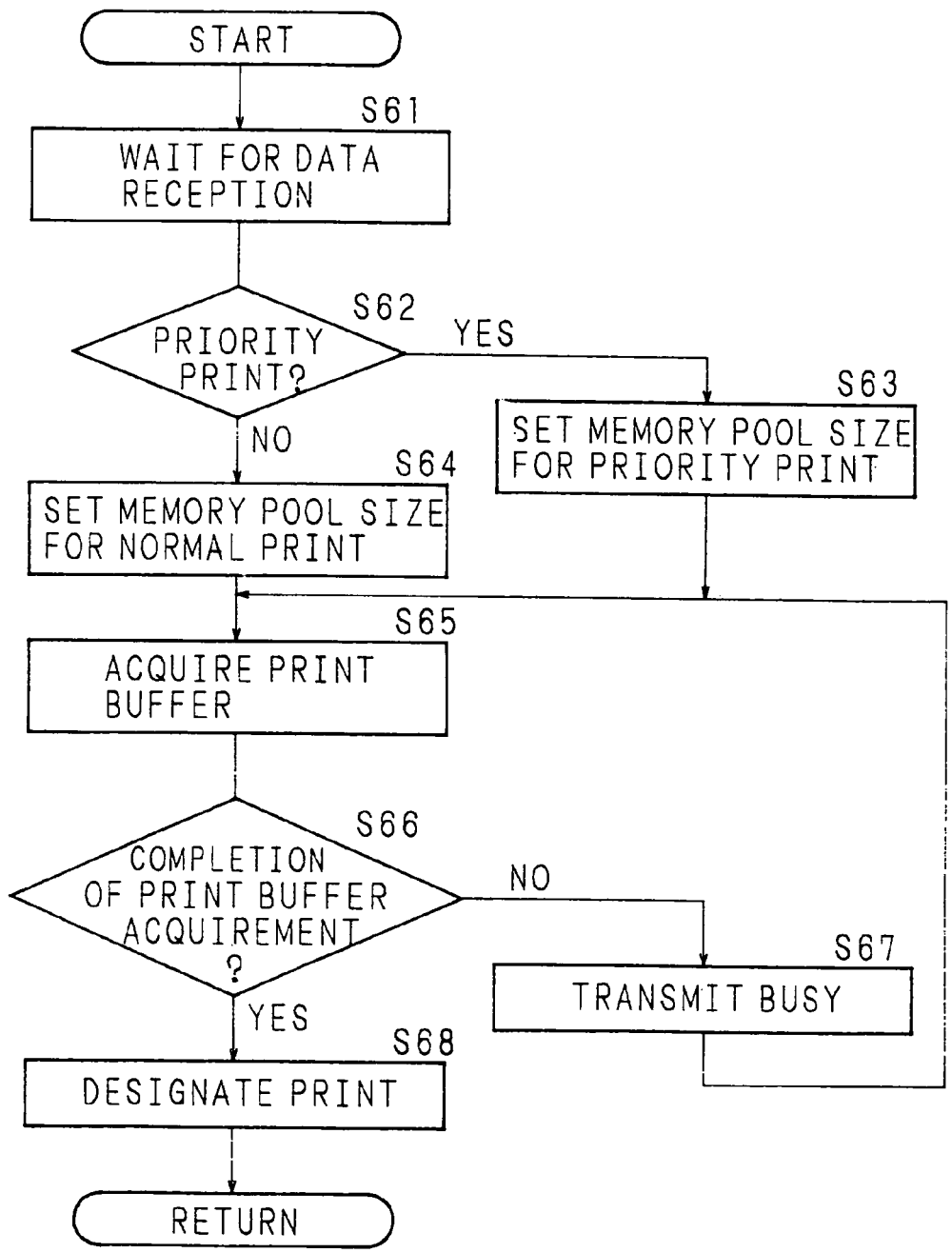
FIG. 24 is a flow chart showing the operation procedure of normal and priority printing in the printing apparatus according to this invention.

Now referring to the flow chart of FIG. 24 indicating the processing procedure, the operation will be described. When the print data is transmitted from a host device, "wait for data reception" is started at Step S61. And judgment is made on whether the received data is priority print data or normal print data (Step S62). In the case of priority print data, the procedure advances to Step S65 with the buffer area combining the normal buffer area and priority buffer area designated as a buffer size (Step S63), and in the case of normal print data, the procedure advances to Step S65 only with the normal buffer area the procedure advances designated as a buffer size.

At Step S65, the print buffer is acquired from the memory pool within the size set in the pretreatment (Step S63, S64). The acquirement size in this event depends on the size of the received print data. However, when the print data is stored in the print buffer after analyzing/modifying, this acquirement size differs from the size of the received print data. Then, judgment is made on whether the print buffer can be acquired from the memory pool (Step S66). If it is impossible to acquire the print buffer, BUSY is transmitted to the host device (Step S67) and the procedure comes back to Step S65. When the print buffer is acquired, the print designation is given to the print control section 20 (Step S68) and the procedure returns.

Figure 25:
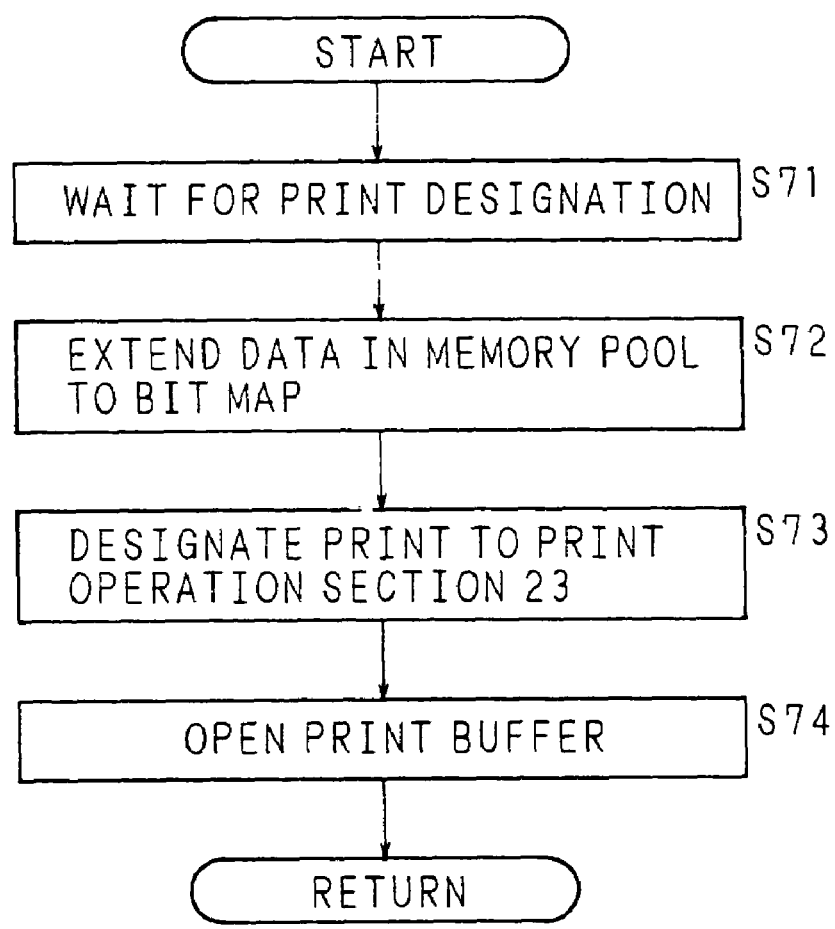
FIG. 25 is a flow chart showing the operation procedure of print process in the printing apparatus according to this invention.

FIG. 25 is a flow chart showing the operation procedure of the print control section 20 which controls the print operation section 23 after receiving the print designation. When the memory pool is filled with the print data or when all the received print data is stored in the memory pool (print data storage memory 17), the procedure is started at Step S71 by the print designation from Step S68. The stored print data is analyzed and extended in bit map(Step S72). If the stored print data is already extended in bit map, this processing is not needed. Then, the print designation is given to the print operation section 23 (Step S73) and the print buffer is opened to the memory pool (Step S74) and the procedure returns. In this event, when the print data is warranted, this opening processing shall be carried out after outputting print results. If the print data is not necessary to be warranted or the print data is warranted on the host device side, this opening processing may be carried out right after Step S72.

As described above, because the buffer area for storing the priority print data from the host device for priority printing is provided beforehand, even when the buffer area in normal printing is full, reception of the print data from the host device for this priority printing is enabled. Consequently, the print data from the host device for priority printing is always received and transmission of the priority print data can be completed faster and the operation efficiency of the host device which assigned priority printing can be improved.

Figure 26:
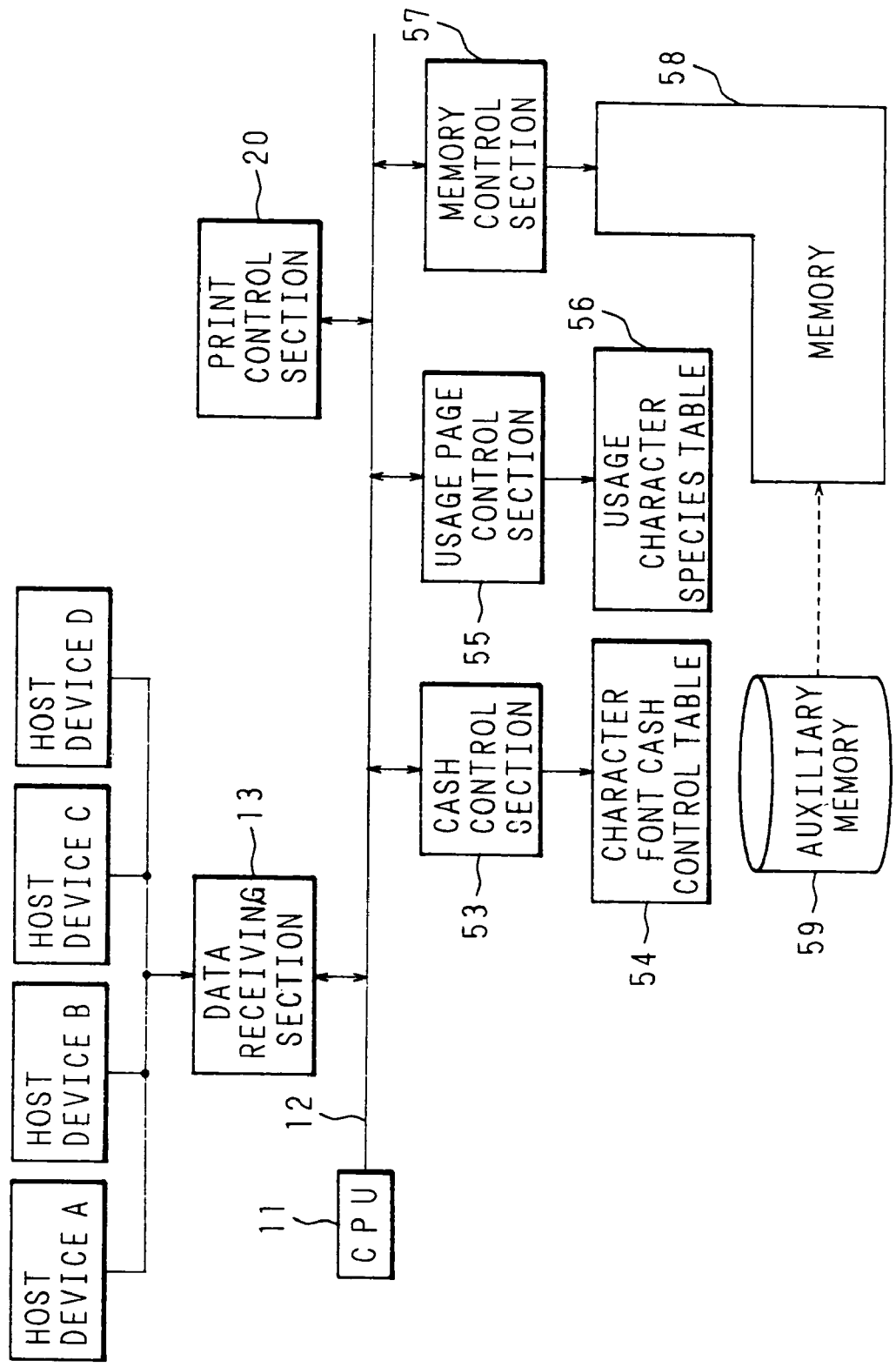
FIG. 26 is a block diagram showing the configuration of the cash control system of character font pattern in the printing apparatus according to this invention.

Next description will be made on the character font pattern cash control system in the printing apparatus of this invention. FIG. 26 is a block diagram showing the configuration of this system, and in FIG. 26, the same symbols are reallotted to the portions same as those in FIG. 6 and explanation will be omitted. To the data bus 12 linked to CPU 11, a cash control section 53 which prepares a character font cash control table 54 for storing the cash state, a usage page control section 55 which prepares a usage character species table 56 for storing usage character species in the page and controls the number of pages used for each character species, and a memory control section 57 which controls the vacant state of a memory 58 as a main memory are connected. To the memory 58, connected is an auxiliary memory 59 to cash the character font pattern stored in the auxiliary memory 59 to the memory 58 and the printing of the cashed dot pattern is controlled at the print control section 20.

FIG. 27 shows the constitution of the character font cash control table 54. The character font cash control table 54 exists for every character species containing the information such as font, character size, etc. In the relevant character font cash control table 54, a load flag indicating the information on whether the character font pattern is cashed or not and a usage page counter indicating the number of used pages are contained.

FIG. 28 shows the construction of the usage character species table 56. It stores the number of character species and each character species in one page. The usage character species table 56 serves to indicate which character species are used in one page and decrements the usage page counter of character species referring to this usage character species table 56 when printing of each page is completed.

Next, the operation is described. The data receiving section 13 analyzes print data (character data) received from each host device and notifies the character species (font, size, etc.) and character code to the cash control section 53. The cash control section 53 refers to the character font cash control table 54 of the corresponding character species, examines the cash state (whether the character font pattern is cashed or not) by the load flag, and if loading to the memory 58 has not yet been carried out, loading is carried out from the auxiliary memory 59 to the memory 58. Simultaneously, if the usage page control section 55 retrieves the usage character species table 56 and finds that a character species has not yet been registered, that is, the character species is first used, it registers the character species to the usage character species table 56 and updates the number of usage character species, and increments the usage page counter of the character species of the character font cash control table 54.

When cash processing from the auxiliary memory 59 to the memory 58 is completed, CPU 11 makes a print request to the print control section 20. After making the print request, the notified usage page control section 55 refers to the usage character species table 56 and counts down the usage page counter of the character font cash control table 54 of each character species used in the page. Thereafter, the usage page control section 55 clears the usage character species table 56 and gets ready for the next page.

When it is judged that there is no vacant area in the memory 58 in the memory control section 57, the character font not used at the moment, that is, the font pattern of the character species whose usage page counter of the character font cash control table 54 is zero, is deleted from the memory 58. The character font cash control operation as described above is carried out in parallel for each logical printer.

When power supply is interrupted, the memory control section stores the character font cash control table 54 in the auxiliary memory 59 and reads the stored character font cash control table 54 from the auxiliary memory 59 at the time of next IPL (Initial Programming Load), and preloads font patterns so that the cash state when the power supply is interrupted is recovered.

As described above, because cash control by character species including the code system is carried out, cashing of the code with different character species is facilitated. Because deletion by the number of usage pages is also carried out, there is no fear of deleting frequently used character fonts. Since deletion is carried out when the memory 58 becomes full, waste in vacant memory is not generated. As a result, it is possible to efficiently control various character fonts and print at the high speed without generating waste in the memory 58.

As described above, in this invention, because the print request from a plurality of devices is controlled by the queue, the print request can independently be controlled for each device and the print request from each device can be simultaneously received. It is also possible to stop the print only of a specific device without affecting printings of other devices.

Because in this invention, the paper feed inlet and the paper discharge outlet are assigned for each logical printer, the operator can optionally assign the paper feed inlet and the paper discharge outlet without changing the conventional application from the device. It is, therefore, possible to prevent coexistence of printed paper from different devices at the discharge outlet if the same discharge outlet is not specified for a plurality of logical printers. Because the operation state of all the logical printers is displayed in a list, for example, on one operation panel, the operator can easily control a plurality of logical printers.

Because an area for storing only the priority print data is independently provided in this invention, even if the print data storage area used for normal print is fully occupied, reception of the priority print data is enabled and operability of the device in priority printing can be improved.

Because cashing of character font patterns is controlled by character species in this invention, cashing of character font patterns with different size, font, and code system is facilitated. In particular, facilitating cashing of character font patterns with a different code system is extremely effective in realizing a plurality of logical printers with different emulation on one printing apparatus. Because font patterns are deleted in accordance with the number of usage pages, frequently used font patterns are not deleted. Because deletion of font patterns takes place only when there is no vacancy in main memory, there is no waste in a vacant memory and effective use of memory is realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A printing control method in a printing apparatus which has a plurality of paper feed inlets and a plurality of paper discharge outlets, establishes a plurality of logical printers, each of which is used exclusively by a corresponding one of a plurality of devices, and prints using one of the plurality of logical printers in accordance with a print request from the corresponding one of the plurality of devices, comprising:

establishing a relevant logical printer selected from the plurality of logical printers corresponding to the print requesting device;

specifying a paper feed inlet and a paper discharge outlet for each of the logical printers, respectively, and storing specified paper feed inlets and paper discharge outlets in a table;

assigning a paper feed inlet and a paper discharge outlet for each of the established logical printers based on the contents stored in the table; and receiving a print request from one of the plurality of devices independently of receiving a print request from another of the plurality of devices, and processing the print requests from each of the plurality of devices independently.

2. A printing control method according to claim 1, wherein a paper discharge outlet is assigned for each of the logical printers, so that the same paper discharge outlet is not assigned to another of the logical printers.

3. A printing control method according to claim 1, wherein a paper feed inlet and a paper discharge outlet for each logical printer, are assigned by a panel operation.

4. A printing control method according to claim 1, wherein the states of the logical printers are displayed in a list.

* * * * *